(12) United States Patent
McCormick et al.

(10) Patent No.: US 8,267,100 B2
(45) Date of Patent: *Sep. 18, 2012

(54) LOW PROFILE NON-CLOGGING NON-POLLUTING SURFACE TREATING PADS, ASSEMBLIES AND METHODS

(75) Inventors: James P. McCormick, Sandy, UT (US); Alan G. McCormick, Sandy, UT (US); Kerry G. Smith, Brighton, UT (US)

(73) Assignee: Hydro Engineering Equipment & Supply Company, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/436,009

(22) Filed: May 5, 2009

(65) Prior Publication Data

US 2009/0266387 A1    Oct. 29, 2009

Related U.S. Application Data

(63) Continuation of application No. 10/884,361, filed on Jul. 2, 2004, now Pat. No. 7,530,362, which is a continuation-in-part of application No. 09/798,426, filed on Mar. 2, 2001, now Pat. No. 6,799,591.

(51) Int. Cl.
*B08B 3/04* (2006.01)
*B08B 3/00* (2006.01)
*B08B 9/00* (2006.01)
(52) U.S. Cl. .................. 134/123; 134/104.2; 134/104.4
(58) Field of Classification Search ............ 134/104.2, 134/104.4, 123
See application file for complete search history.

(56) References Cited

U.S. PATENT DOCUMENTS

| 124,061 A | 2/1872 | Hodgman |
| 582,395 A | 5/1897 | McDougall |

(Continued)

FOREIGN PATENT DOCUMENTS

GB    2256443 A1    12/1992
(Continued)

OTHER PUBLICATIONS

Information about Related Patents and Patent Applications and Litigation Information, see the sections of the accompanying Information Disclosure Statement Letter entitled "Related Patents and Patent Applications" and "Litigation Information" for further information.

(Continued)

*Primary Examiner* — Michael Barr
*Assistant Examiner* — Charles W Kling
(74) *Attorney, Agent, or Firm* — Holland & Hart LLP

(57) ABSTRACT

Low profile wash pads, usable alone or with other like pads in a module array, are disclosed whereby one or more motor driven or motorless vehicles may be wheeled onto or across (or other object placed upon) a full drainage impervious washing platform such that substantially all spent wash liquid and removed debris are caused to flow off from the washing platform to an edge collector or gutter. Debris accumulation at the washing platform is avoided and processing of gutter-contained spent wash liquid and removed debris can occur in offset relation to and without interfering with ongoing washing on the washing platform. Several modes for processing the drainage comprising spent wash liquid and removed debris contained in the gutter are disclosed, one mode comprising automated processing using a screw conveyor.

33 Claims, 14 Drawing Sheets

U.S. PATENT DOCUMENTS

| | | | |
|---|---|---|---|
| 830,437 | A | 9/1906 | Humphrey |
| 1,146,845 | A | 7/1915 | Burham |
| 1,863,914 | A | 6/1932 | Tyler |
| 1,899,657 | A | 2/1933 | Zademach |
| 2,013,742 | A | 9/1935 | Butler |
| 2,352,356 | A | 6/1944 | Albertson |
| 2,788,954 | A | 4/1957 | Paasche |
| 3,101,148 | A | 8/1963 | Brown |
| 3,175,564 | A | 3/1965 | Baird, Jr. et al. |
| 3,259,138 | A | 7/1966 | Heinicke |
| 3,772,723 | A | 11/1973 | Krimm |
| 3,784,044 | A | 1/1974 | Bruggeman et al. |
| 3,803,777 | A | 4/1974 | Stewart |
| 3,923,658 | A * | 12/1975 | Lancaster ............... 210/108 |
| 3,970,556 | A | 7/1976 | Gore |
| 3,971,394 | A | 7/1976 | Osborne |
| 3,996,136 | A | 12/1976 | Jakubek et al. |
| 4,071,223 | A | 1/1978 | Demarest |
| 4,135,533 | A | 1/1979 | Gall et al. |
| 4,246,982 | A | 1/1981 | Pretnick |
| 4,308,136 | A | 12/1981 | Warne, Jr. |
| 4,498,660 | A | 2/1985 | Brema et al. |
| 4,543,182 | A | 9/1985 | Gramse et al. |
| 4,637,413 | A | 1/1987 | Llewellyn et al. |
| 4,652,368 | A | 3/1987 | Ennis et al. |
| 4,765,670 | A | 8/1988 | Jackson |
| 4,808,237 | A | 2/1989 | McCormick et al. |
| 4,818,388 | A | 4/1989 | Morioka et al. |
| 4,930,632 | A | 6/1990 | Eckert et al. |
| 5,033,489 | A | 7/1991 | Ferre et al. |
| 5,036,976 | A | 8/1991 | Sechler et al. |
| 5,145,309 | A * | 9/1992 | Foster ............... 414/525.1 |
| 5,150,727 | A | 9/1992 | D'Amato |
| 5,167,837 | A | 12/1992 | Snodgrass et al. |
| 5,186,758 | A | 2/1993 | Hartman |
| 5,190,268 | A | 3/1993 | Espinueva |
| 5,199,457 | A | 4/1993 | Miller |
| 5,207,922 | A | 5/1993 | McFarlan et al. |
| 5,253,777 | A | 10/1993 | Schutz |
| 5,261,433 | A | 11/1993 | Smith |
| 5,265,630 | A | 11/1993 | Hartmann |
| 5,300,341 | A | 4/1994 | Gross |
| 5,316,589 | A * | 5/1994 | Krieger, Jr. ............... 134/10 |
| 5,330,579 | A | 7/1994 | Rushing et al. |
| 5,349,722 | A | 9/1994 | Chayer |
| 5,374,352 | A | 12/1994 | Pattee |
| 5,383,483 | A | 1/1995 | Shibano |
| 5,423,339 | A | 6/1995 | Latimer |
| 5,458,299 | A | 10/1995 | Collins et al. |
| 5,462,655 | A | 10/1995 | Ladd et al. |
| 5,498,329 | A | 3/1996 | Lamminen et al. |
| 5,535,766 | A | 7/1996 | Edwards |
| 5,547,312 | A | 8/1996 | Schmitz, Jr. |
| 5,556,535 | A | 9/1996 | Van Der Est |
| 5,560,782 | A | 10/1996 | Latimer |
| 5,590,671 | A | 1/1997 | Yachera |
| 5,595,308 | A | 1/1997 | King et al. |
| 5,597,001 | A | 1/1997 | Rasmussen et al. |
| 5,647,977 | A | 7/1997 | Arnaud |
| 5,669,982 | A | 9/1997 | Latimer |
| 5,673,715 | A | 10/1997 | Carter |
| 5,730,164 | A | 3/1998 | Midkiff et al. |
| 5,732,646 | A | 3/1998 | Brandt |
| 5,738,139 | A | 4/1998 | DeChard |
| 5,785,067 | A | 7/1998 | Kosofsky |
| 5,797,994 | A | 8/1998 | Rasmussen |
| 5,803,982 | A | 9/1998 | Kosofsky et al. |
| 5,839,852 | A | 11/1998 | Mattson |
| 5,848,856 | A | 12/1998 | Bohnhoff |
| 5,901,526 | A | 5/1999 | Vidmar et al. |
| 6,000,631 | A | 12/1999 | Lamminen et al. |
| 6,021,792 | A | 2/2000 | Petter et al. |
| 6,082,382 | A | 7/2000 | Buksa et al. |
| 6,106,712 | A | 8/2000 | New |
| 6,120,614 | A | 9/2000 | Damron et al. |
| 6,132,509 | A | 10/2000 | Kuschnereit |
| 6,164,298 | A | 12/2000 | Petter et al. |
| 6,247,480 | B1 | 6/2001 | Wegner |
| 6,279,271 | B1 | 8/2001 | Burkart, Jr. |
| 6,293,523 | B1 | 9/2001 | Fendler |
| 6,301,848 | B1 * | 10/2001 | Whitaker ............... 52/302.1 |
| 6,358,330 | B1 | 3/2002 | McGraw |
| 6,402,855 | B1 | 6/2002 | Damron et al. |
| 6,561,201 | B1 | 5/2003 | Midkiff |
| 6,601,831 | B2 | 8/2003 | Erwin |
| 6,655,396 | B2 | 12/2003 | Krenzel |
| 6,799,591 | B2 | 10/2004 | McCormick et al. |
| 7,258,749 | B2 | 8/2007 | McCormick et al. |
| 7,303,358 | B1 | 12/2007 | Fuller |
| 2002/0117191 | A1 | 8/2002 | Krenzel |
| 2003/0205257 | A1 | 11/2003 | Gross |
| 2004/0200503 | A1 | 10/2004 | McCormick et al. |
| 2004/0231703 | A1 | 11/2004 | McCormick et al. |
| 2005/0139243 | A1 * | 6/2005 | Hay et al. ............... 134/104.2 |
| 2006/0169965 | A1 | 8/2006 | Paskar |
| 2009/0250176 | A1 | 10/2009 | Ryan et al. |

FOREIGN PATENT DOCUMENTS

| | | |
|---|---|---|
| GB | 2261000 | 5/1993 |
| JP | 58-188740 | 11/1983 |
| JP | 3-90455 | 4/1991 |
| JP | 4-38252 | 2/1992 |
| JP | 7-52761 | 2/1995 |
| JP | 7-172271 | 7/1995 |
| JP | 8-034321 | 2/1996 |
| JP | 8-175342 | 7/1996 |
| JP | 08175342 A * | 7/1996 |
| JP | 10-277311 | 10/1998 |
| WO | WO 97/01399 | 1/1997 |

OTHER PUBLICATIONS

Complaint, *Petter Investemetns Inc.* v. *Hydro Engineering, Inc., et al.*, Civil Action No. 1:07-cv-1033, Oct. 12, 2007 (45 pages).

Defendant's Answer and Counterclaims, *Petter Investments, Inc.* v. *Hydro Engineering, Inc., et al.*, Civil Action No. 1:07-cv-1033, Jan. 28, 2008 (43 pgs.).

Plaintiff's Answer to Defendant's Amended Counterclaims, *Petter Investments, Inc.* v. *Hydro Engineering, Inc., et al.*, Civil Action No. 1:07-cv-1033, Feb. 15, 2008 (5 pgs.).

Defendant's Disclosure of Asserted Patent Claims Pursuant to Scheduling Order, *Petter Investments, Inc.* v. *Hydro Engineering, Inc., et al.*, Civil Action No. 1:07-cv-1033, Jun. 2, 2008 (5 pgs).

Plaintiff's Patent Claims, *Petter Investments, Inc.* v. *Hydro Engineering, Inc., et al.*, Civil Action No. 1:07-cv-1033, Jun. 2, 2008 (2 pgs.).

Defendant's Amended Answer and Counterclaims, *Petter Investments, Inc.* v. *Hydro Engineering, Inc.*, et al., Civil Action No. 1:07-cv-1033, Feb. 4, 2008 (43 pgs.).

Affordable Wash Pad, Hydro Engineering Inc., (Marked HE 000077) Jun. 2000 (1 pg.).

Biggest Discount, Hydro Engineering Inc., (Marked HE 000068) Mar. 27, 2001 (1 pg.).

CETA Show News, Hydro Engineering Inc., (Marked HE 000049) Sep. 22, 2000 (1 pg.).

Complete Washing System, Hydro Engineering Inc., (Marked HE 000040) Feb. 10, 1999 (1 pg.).

Contain & Collect, Hydro Engineering Inc., (Marked HE 000087) Aug. 27, 1998 (1 pg.).

Contain & Collect, Hydro Engineering Inc., (Marked HE 000106) Jun. 5, 1998 (1 pg.).

Defendants' Amended Disclosure of Prior Art Pursuant to Scheduling Order, *Petter Investments, Inc.* vs. *Hydro Engineering, Inc., et al.*, Civil Action No. 1:07-cv-1033, Jul. 11, 2008 (5 pgs.).

Defendants' Claim Construction Brief (U.S. Patent No. 6,021,792), *Petter Investments, Inc.* vs. *Hydro Engineering, Inc., et al.*, Civil Action No. 1:07-cv-1033, Oct. 1, 2008 (70 pgs.).

Defendants' Disclosure of Prior Art Pursuant to Scheduling Order, *Petter Investments, Inc.* vs. *Hydro Engineering, Inc., et al.*, Civil Action No. 1:07-cv-1033, Jul. 1, 2008 (5 pgs.).

Defendants' Memorandum in Support of Motion for Summary Judgment of Equitable Estoppel and Non-Infringement, *Petter Investments, Inc.* vs. *Hydro Engineering, Inc., et al.*, Civil Action No. 1:07-cv-1033, Sep. 5, 2008 (132 pgs.).

Defendants' Motion for Summary Judgment of Equitable Estoppel and Non-Infringement, *Petter Investments, Inc.* vs. *Hydro Engineering, Inc., et al.*, Civil Action No. 1:07-cv-1033, Sep. 5, 2008 (2 pgs.).
Defendants' Reply Memorandum in Support of Motion for Summary Judgment of Equitable Estoppel and Non-Infringement, *Petter Investements, Inc.* v. *Hydro Engineering, Inc., et al.*, Civil Action No. 1:07-cv-1033, Oct. 23, 2008 (18 pgs).
Defendants' Responsive Claim Construction Brief (U.S. Patent Nos. 6,799,591 and 7,258,749), *Petter Investments, Inc.* vs. *Hydro Engineering, Inc., et al.*, Civil Action No. 1:07-cv-1033, Oct. 15, 2008 (49 pgs).
Defendants' Supplemental Disclosure of Prior Art Pursuant to Scheduling Order, *Petter Investments, Inc.* vs. *Hydro Engineering, Inc., et al.*, Civil Action No. 1:07-cv-1033, Jul. 30, 2008 (2 pgs.).
EPA Compliance, Hydro Engineering Inc., (Marked HE 000044) Oct. 1999 (1 pg.).
Extended Terms, Hydro Engineering Inc., (Marked HE 000038) May 21, 1999 (1 pg.).
First and Still Best, Hydro Engineering Inc., (Marked HE 000048) Oct. 20, 2000 (1 pg.).
For Serious Distributors, Hydro Engineering Inc., (Marked HE 000069) Jan. 10, 2001 (1 pg.).
Free Demo Hydropad, Hydro Engineering Inc., (Marked HE 000055) Jun. 2, 2000 (1 pg.).
How Big is Your Wash Job?, Hydro Engineering Inc., (Marked HE 000071) Dec. 15, 2000 (1 pg.).
How to Sell Hydropads™, Hydro Engineering Inc., (Marked HE 000050) Sep. 11, 2000 (1 pg.).
Hurry!, Hydro Engineering Inc., (Marked HE 000054) Jun. 9, 2000 (1 pg.).
Hydro Engineering, Inc.'s History Invoice, (Marked HE 010598-010599) Apr. 25, 1997 (2 pgs).
Hydro Zero Interest Lease, Hydro Engineering Inc., (Marked HE 000070) Jan. 5, 2001 (1 pg.).
Hydroblaster Pressure Washer, (Marked PET 002895) May 8, 1998 (1 pg).
Hydroblasters Pad Site Evaluation Form, see the section of the accompanying Information Disclosure Statement Letter entitled "Date Information" for information about the date of this reference (3 pgs).
Hydropad Update, Hydro Engineering Inc., (Marked HE 000045) Aug. 24, 1999 (1 pg.).
Hydropad™ Success, Hydro Engineering Inc., (Marked HE 000042) Jul. 16, 1999 (1 pg.).
Indoor Washing, Hydro Engineering Inc., (Marked HE 000086) Nov. 20, 1998 (1 pg.).
Indoor Washing, Hydro Engineering Inc., (Marked HE 000101) Oct. 30, 1998 (1 pg.).
Instant Wash Pad, Hydro Engineering Inc., (Marked HE 000100) Feb. 2, 1999 (1 pg.).
Instant Wash Site, Hydro Engineering Inc., (Marked HE 000039) Mar. 25, 1999 (1 pg.).
Instant Wash Site, Hydro Engineering Inc., (Marked HE 000043) Jun. 1999 (1 pg.).
Instant Wash Site, Hydro Engineering Inc., (Marked HE 000072) Sep. 14, 2000 (1 pg.).
Instant Wash Site, Hydro Engineering Inc., (Marked HE 000074) Aug. 31, 2000 (1 pg.).
Instant Wash Site, Hydro Engineering Inc., (Marked HE 000078) May 1999 (1 pg.).
Instant Wash Site, Hydro Engineering Inc., (Marked HE 000080) Mar. 17, 2000 (1 pg.).
Instant Wash Site, Hydro Engineering Inc., (Marked HE 000082) Dec. 1999 (1 pg.).
Instant Wash Site, Hydro Engineering Inc., (Marked HE 000084) Jun. 18, 1999 (1 pg.).
Instant Wash Site, Hydro Engineering Inc., (Marked HE 000085) Mar. 29, 1999 (1 pg.).
Instant/Portable Wash Pads, Hydro Engineering, Inc., (Marked HE 000041) Oct. 25, 2001 (1 pg.).
Is This Tough or What?, Hydro Engineering Inc., (Marked HE 000046) Dec. 16, 1999 (1 pg.).
Joint Comprehensive Statement, *Petter Investments, Inc.* vs. *Hydro Engineering, Inc., et al.*, Civil Action No. 1:07-cv-1033, Sep. 19, 2008 (15 pgs.).
More Pressure. Less Hassle, Pressure Island, see the section of the accompanying Information Disclosure Statement Letter entitled "Date Information" for information about the date of this reference (Marked. PET 003037-3038) (2 pgs).
Need a Wash Pad?, Hydro Engineering Inc., (Marked HE 000108) May 15, 1998 (1 pg.).
No More Washing on the Ground?, Hydro Engineering Inc., (Marked HE 000081) Jan. 28, 2000 (1 pg.).
No Where to Wash?, Hydro Engineering Inc., (Marked HE 000056) Apr. 19, 2000 (1 pg.).
Plaintiff Petter Investments, Inc.'s Claim Construction Brief Regarding U.S. Patent Nos. 6,799,591 and 7,258,749, *Petter Investments, Inc.* vs. *Hydro Engineering, Inc., et al.*, Civil Action No. 1:07-cv-1033, Oct. 1, 2008 (468 pgs.).
Plaintiff Petter Investments, Inc.'s Response to Defendants' Brief on Claim Construction, *Petter Investments, Inc.* vs. *Hydro Engineering, Inc., et al.*, Civil Action No. 1:07-cv-1033, Oct. 15, 2008 (32 pgs).
Plaintiff's Prior Art Disclosures, *Petter Investments, Inc.* vs. *Hydro Engineering, Inc., et al.*, Civil Action No. 1:07-cv-1033, Jul. 1, 2008 (3 pgs.).
PME Inc., PortaPad, Pressure Wash Degreasing Recovery (Marked PET 002897-00291) undated (5 pgs).
Portable Pad Site, Hydro Engineering Inc., (Marked HE 000109) May 8, 1998 (1 pg.).
Portable System, Hydro Engineering Inc., (Marked HE 000104) Jun. 12, 1998 (1 pg.).
Portable, Indoors and Outdoors, Hydro Engineering Inc., (Marked HE 000053) Aug. 4, 2000 (1 pg.).
Rinsate Pad, Enviornment Products, Inc., see the section of the accompanying Information Disclosure Statement Letter entitled "Date Information" for information about the date of the reference (Marked PET 003036) (1 pg).
Secondary Containment, Hydro Engineering Inc., (Marked 000107) May 29, 1998 (1 pg.).
Secondary Containment, Hydro Engineering Inc., (Marked HE 000102) Sep. 11, 1998 (1 pg.).
Skid Pricing, Hydro Engineering Inc., (Marked HE 000051), see the section of the accompanying Information Disclosure Statement Letter entitled "Date Information" for the information about the date of this reference (1 pg).
Special Offer, Hydro Engineering Inc., (Marked HE 000105) Jun. 12, 1998 (1 pg.).
The ATWS Can Handle It, Hydro Engineering Inc., (Marked HE 000083) Jul. 1999 (1 pg.).
The Cyclonator, Riveer Company, Saugatuck, MI (Marked PET 002902-002905) Apr. 15, 1998 (4 pgs.).
Transportable Wash Site?, Hydro Engineering Inc. (Marked HE 000073) Sep. 1, 2000 (1 pg.).
Vacu-Boom, Waste Water Capture System and Spill Containment System, Pressure Power System, Inc., see the section of the accompanying Information Disclosure Statement Letter entitled "Date Information" for information about the date of this reference (Marked PET 004949-004952) (4 pgs).
Wash Legally, Hydro Engineering Inc., (Marked HE 000079) May 2000 (1 pg.).
Wash Pad Odor Control, Hydro Engineering, Inc., (Marked HE 000076) Jun. 2000 (1 pg.).
Washing-Legally, Hydro Engineering Inc., (Marked HE 000088) Jul. 24, 1998 (1 pg.).
Washing-Legally, Hydro Engineering Inc., (Marked HE 000103) Jul. 31, 1998 (1 pg.).
Webpage located at http://web.archive.org/web/*/http://www.hydroblaster.com, Internet Archive Wayback Machine, multiple dates (see each webpage entry for exact date) (first page marked PET 006623) (23 pgs).
Webpage located at http://web.archive.org/web/19990420175132/http://www.hydroblaster.com/ Internet Archive Wayback Machine Apr. 20, 1999 (1 pg).

Webpage located at http://web.archive.org/web/19990427035906/www.hydroblaster.com/ Internet Archive Wayback Machine Apr. 27, 1999 (1 pg).

Webpage located at http://web.archive.org/web/19990506040457/www.hydroblaster.com/hydropad/index.htm Internet Archive Wayback Machine May 6, 1999 (1 pg).

Webpage located at http://web.archive.org/web/19991009073338/www.hydroblaster.com/filter/2c.htm, Internet Archive Wayback Machine, Oct. 9, 1999 (1 pg).

Webpage located at http://web.archive.org/web/19991009085647/www.hydroblaster.com/filter/3c.htm, Internet Archive Wayback Machine, Oct. 9, 1999 (1 pg).

Webpage located at http://web.archive.org/web/19991011222907/www.hydroblaster.com/filter/hsca.htm, Internet Archive Wayback Machine, Oct. 11, 1999 (1 pg).

Webpage located at http://web.archive.org/web/19991012023157/www.hydroblaster.com/filter/kleen.htm, Internet Archive Wayback Machine, Oct. 12, 1999 (2 pgs).

Webpage located at http://web.archive.org/web/19991012060222/www.hydroblaster.com/filter/ls.htm, Internet Archive Wayback Machine, Oct. 12, 1999 (1 pg).

Webpage located at http://web.archive.org/web/19991012103834/www.hydroblaster.com/filter/sp.htm, Internet Archive Wayback Machine, Oct. 12, 1999 (1 pg).

Webpage located at http://web.archive.org/web/19991012115257/www.hydroblaster.com/filter/spsb.htm, Internet Archive Wayback Machine, Oct. 12, 1999 (1 pg).

Webpage located at http://web.archive.org/web/19991012200412/www.hydroblaster.com/hydropad/link1.htm Internet Archive Wayback Machine Oct. 12, 1999 (2 pgs).

Webpage located at http://web.archive.org/web/19991103024325/www.hydroblaster.com/gsa/index1.htm, Internet Archive Wayback Machine, Nov. 3, 1999 (1 pg).

Webpage located at http://web.archive.org/web/19991103041459/www.hydroblaster.com/hydropad/index.htm, Internet Archive Wayback Machine, Nov. 3, 1999 (1 pg).

Webpage located at http://web.archive.org/web/19991103051827/www.hydroblaster.com/hydropad/link1.htm, Internet Archive Wayback Machine, Nov. 3, 1999 (2 pgs).

Webpage located at http://web.archive.org/web/19991110144806/www.hydroblaster.com/filter/hsc.htm, Internet Archive Wayback Machine, Nov. 10, 1999 (1 pg).

Webpage located at http://web.archive.org/web/20000116022104/www.hydroblaster.com/bottom~1.htm, Internet Archive Wayback Machine, Jan. 16, 2000 (1 pg).

Webpage located at http://web.archive.org/web/20000120015252/www.hydroblaster.com/top~1.htm, Internet Archive Wayback Machine, Jan. 20, 2000 (1 pg).

Webpage located at http://web.archive.org/web/20000122052644/www.hydroblaster.com/left~1.htm, Internet Archive Wayback Machine, Jan. 22, 2000 (1 pg).

Webpage located at http://web.archive.org/web/20000122083344/www.hydroblaster.com/top~1.htm, Internet Archive Wayback Machine, Jan. 22, 2000 (1 pg).

Webpage located at http://web.archive.org/web/20000208025222/www.hydroblaster.com/filter/hsc.htm, Internet Archive Wayback Machine, Feb. 8, 2000 (1 pg).

Webpage located at http://web.archive.org/web/20000304005038/www.hydroblaster.com/bottom~1.htm, Internet Archive Wayback Machine, Mar. 4, 2000 (1 pg).

Webpage located at http://web.archive.org/web/20000305081303/hydroblaster.com/top~1.htm, Internet Archive Wayback Machine, Mar. 5, 2000 (1 pg).

Webpage located at http://web.archive.org/web/20000325022233/www.hydroblaster.com/filter/hsca.htm, Internet Archive Wayback Machine, Mar. 25, 2000 (1 pg).

Webpage located at http://web.archive.org/web/20000325042521/www.hydroblaster.com/filter/sp.htm, Internet Archive Wayback Machine, Mar. 25, 2000 (1 pg).

Webpage located at http://web.archive.org/web/20000325052754/www.hydroblaster.com/filter/spsb.htm, Internet Archive Wayback Machine, Mar. 25, 2000 (1 pg).

Webpage located at http://web.archive.org/web/20000417124727/www.hydroblaster.com/bottom~1.htm, Internet Archive Wayback Machine, Apr. 17, 2000 (1 pg).

Webpage located at http://web.archive.org/web/20000419024547/hydroblaster.com/filter/kleen.htm, Internet Archive Wayback Machine, Apr. 19, 2000 (2 pgs).

Webpage located at http://web.archive.org/web/20001025030924/www.hydroblaster.com/, Internet Archive Wayback Machine, Oct. 25, 2000 (1 pg).

Webpage located at http://web.archive.org/web/20010202150500/www.hydroblaster.com/top~1.htm, Internet Archive Wayback Machine, Feb. 2, 2001 (1 pg).

Webpage located at http://web.archive.org/web/20010202175400/www.hydroblaster.com/bottom~1.htm, Internet Archive Wayback Machine, Feb. 2, 2001 (1 pg).

Webpage located at http://web.archive.org/web/20010203132700/hydroblaster.com/bottom~1.htm, Internet Archive Wayback Machine, Feb. 3, 2001 (1 pg).

Webpage located at http://web.archive.org/web/20010222202426/www.hydroblaster.com/filter/hsc.htm, Internet Archive Wayback Machine, Feb. 22, 2001 (1 pg).

Webpage located at http://web.archive.org/web/20010223004653/www.hydroblaster.com/, Internet Archive Wayback Machine, Feb. 22, 2001 (1 pg).

Webpage located at http://web.archive.org/web/20010405001947/www.hydroblaster.com/filter/kleen.htm, Internet Archive Wayback Machine, Apr. 5, 2001 (2 pgs).

Webpage located at http://web.archive.org/web/20010409040634/www.hydroblaster.com/filter/hsca.htm, Internet Archive Wayback Machine, Apr. 9, 2001 (1 pg).

Webpage located at http://web.archive.org/web/20010409184944/www.hydroblaster.com/filter/sp.htm, Internet Archive Wayback Machine, Apr. 9, 2001 (1 pg).

Webpage located at http://web.archive.org/web/20010409212836/www.hydroblaster.com/filter/spsb.htm, Internet Archive Wayback Machine, Apr. 9, 2001 (1 pg).

Webpage located at http://web.archive.org/web/20010409225715/www.hydroblaster.com/bottom~1.htm, Internet Archive Wayback Machine, Apr. 9, 2001 (1 pg).

Webpage located at http://web.archive.org/web/20010409230945/www.hydroblaster.com/gsa/indexl.htm, Internet Archive Wayback Machine, Apr. 9, 2001 (1 pg).

Webpage located at http://web.archive.org/web/20010410031213/www.hydroblaster.com/top~1.htm, Internet Archive Wayback Machine, Apr. 10, 2001 (1 pg).

Webpage located at http://web.archive.org/web/20010423035006/www.hydroblaster.com/hydropad/index.htm, Internet Archive Wayback Machine, Apr. 23, 2001 (1 pg).

Webpage located at http://web.archive.org/web/20010425164802/www.hydroblaster.com/hydropad/newpads.htm, Internet Archive Wayback Machine, Apr. 25, 2001 (1 pg).

Webpage located at http://web.archive.org/web/20010429080645/www.hydroblaster.com/hydropad/hhl.htm, Internet Archive Wayback Machine, Apr. 29, 2001 (1 pg).

Webpage located at http://web.archive.org/web/20010429081852/www.hydroblaster.com/hydropad/hh3.htm, Internet Archive Wayback Machine, Apr. 29, 2001 (2 pgs).

Webpage located at http://web.archive.org/web/20010429082332/www.hydroblaster.com/hydropad/linkl.htm, Internet Archive Wayback Machine, Apr. 29, 2001 (2 pgs).

Webpage located at http://web.archive.org/web/20010429093215/www.hydroblaster.com/hydropad/hp.htm, Internet Archive Wayback Machine, Apr. 29, 2001 (1 pg).

Webpage located at http://web.archive.org/web/20010505062824/www.hydroblaster.com/hydropad/pads/connecti.htm, Internet Archive Wayback Machine, May 5, 2001 (2 pgs).

Webpage located at http://web.archive.org/web/20010505063024/www.hydroblaster.com/hydropad/pads/forklift.htm, Internet Archive Wayback Machine, May 5, 2001 (2 pgs).

Webpage located at http://web.archive.org/web/20010505063916/www.hydroblaster.com/hydropad/pads/imolym/loganpho.htm, Internet Archive Wayback Machine, May 5, 2001 (2 pgs).

Webpage located at http://web.archive.org/web/20010505064002/www.hydroblaster.com/hydropad/pads/lgn-duct.htm, Internet Archive Wayback Machine, May 5, 2001 (2 pgs).
Webpage located at http://web.archive.org/web/20010505064010/www.hydroblaster.com/hydropad/pads/loganpho.htm, Internet Archive Wayback Machine, May 5, 2001 (2 pgs).
Webpage located at http://web.archive.org/web/20010505065036/www.hydroblaster.com/hydropad/pads/imolym/pic0006.htm, Internet Archive Wayback Machine, May 5, 2001 (2 pgs).
Webpage located at http://web.archive.org/web/20010505065240/www.hydroblaster.com/hydropad/pads/logan-ph.htm, Internet Archive Wayback Machine, May 5, 2001 (2 pgs).
Webpage located at http://web.archive.org/web/20010505071114/www.hydroblaster.com/hydropad/pads/newfolder/pic00010.htm, Internet Archive Wayback Machine, May 5, 2001 (2 pgs).
Webpage located at http://web.archive.org/web/20010505071539/www.hydroblaster.com/hydropad/pads/newdesign.htm, Internet Archive Wayback Machine, May 5, 2001 (2 pgs).
Webpage located at http://web.archive.org/web/20010505072146/www.hydroblaster.com/hydropad/pads/pic00017.htm, Internet Archive Wayback Machine, May 5, 2001 (2 pgs).
Webpage located at http://web.archive.org/web/20010515182854/www.hydroblaster.com/, Internet Archive Wayback Machine, May 15, 2001 (1 pg).
Webpage located at http://web.archive.org/web/20010606210404/www.hydroblaster.com/bottom~1.htm, Internet Archive Wayback Machine, Jun. 6, 2001 (1 pg).
Webpage located at http://web.archive.org/web/20010715125235/www.hydroblaster.com/hydropad/pads/2a.Jpg, Internet Archive Wayback Machine, Jul. 15, 2001 (2 pgs).
Webpage located at http://web.archive.org/web/20010715130228/www.hydroblaster.com/hydropad/pads/1a.JPG, Internet Archive Wayback Machine, Jul. 15, 2001 (2 pgs).
Webpage located at http://web.archive.org/web/20010716161534/www.hydroblaster.com/hydropad/hh2.htm, Internet Archive Wayback Machine, Jul. 16, 2001 (1 pg).
Webpage located at http://web.archive.org/web/20010724150636/www.hydroblaster.com/hydropad/good/connectit~JPG, Internet Archive Wayback Machine, Jul. 24, 2001 (1 pg).
Webpage located at http://web.archive.org/web/20010724150933/www.hydroblaster.com/hydropad/good/big.JPG, Internet Archive Wayback Machine, Jul. 24, 2001 (2 pgs).
Webpage located at http://web.archive.org/web/20010724151552/www.hydroblaster.com/hydropad/good/logant~.JPG, Internet Archive Wayback Machine, Jul. 24, 2001 (2 pgs).
Webpage located at http://web.archive.org/web/20010724200857/www.hydroblaster.com/hydropad/good/loong~.JPG, Internet Archive Wayback Machine, Jul. 24, 2001 (1 pg).
Webpage located at http://web.archive.org/web/20010822230641/www.hydroblaster.com/hydropad/good/bc~.JPG, Internet Archive Wayback Machine, Aug. 22, 2001 (1 pg).
Webpage located at http://web.archive.org/web/20010822233357/www.hydroblaster.com/hydropad/good/rampstrut.jpg, Internet Archive Wayback Machine, Aug. 22, 2001 (2 pgs).
Webpage located at http://web.archive.org/web/20010910185232/www.hydroblaster.com/hydropad/pads/logan.JPG, Internet Archive Wayback Machine, Sep. 10, 2001 (2 pgs).
Webpage located at http://web.archive.org/web/20010911021402/www.hydroblaster.com/hydropad/good/truck~.jpg, Internet Archive Wayback Machine, Sep. 11, 2001 (2 pgs).
Webpage located at http://web.archive.org/web/20011021014455/hydroblaster.com/top~1.htm, Internet Archive Wayback Machine, Oct. 21, 2001 (1 pg).
Webpage located at http://web.archive.org/web/20011129114124/http://hydroblaster.com/, Internet Archive Wayback Machine, Nov. 29, 2001 (1 pg).
Webpage located at http://web.archive.org/web/20011211205251/hydroblaster.com/hydropad/, Internet Archive Wayback Machine, Dec. 11, 2001 (1 pg).
Webpage located at http://web.archive.org/web/20011223091432/hydroblaster.com/hydropad/pg1/, Internet Archive Wayback Machine, Dec. 23, 2001 (2 pgs).
Webpage located at http://web.archive.org/web/20020206054249/hydroblaster.com/h1/3.html, Internet Archive Wayback Machine, Feb. 6, 2002 (1 pg).
Webpage located at http://web.archive.org/web/20020219141525/hydroblaster.com/hydropad/pg4/, Internet Archive Wayback Machine, Feb. 19, 2002 (2 pgs).
Webpage located at http://web.archive.org/web/20020219141709/hydroblaster.com/hydropad/pg2/, Internet Archive Wayback Machine, Feb. 19, 2002 (1 pg).
Webpage located at http://web.archive.org/web/20020219142922/hydroblaster.com/hydropad/pg3/, Internet Archive Wayback Machine, Feb. 19, 2002 (3 pgs).
Webpage located at http://www.pressureisland.com/6x12.htm, 6×12 Pressure Island (Marked PET 003039), Sep. 4, 1998 (1 pg.).
Webpage located at http://www.pressureisland.com/6x6.htm, 6×6 Pressure Island (Marked PET 003034-003035), Sep. 4, 1998 (2 pgs.). Welcome Home, To . . . Pressure Island, the Next Generation in Cleaning, see the section of the accompanying Information Disclosure Statement Letter entitled "Date Information" for information about the date of this reference (Marked PET 002896) (1 pg).
Where to Wash a Bobcat?, Hydro Engineering Inc., (Marked HE 000052) Aug. 9, 2000 (1 pg.).
Where to Wash a Bobcat?, Hydro Engineering Inc., (Marked HE 000075) Aug. 2000 (1 pg.).
Opinion, Civil Case No. 1:07-CV-01033, filed Sep. 8, 2009 (23 pages).
Claim Construction Memorandum Re: "Impervious Top" and "Side/Edge", Civil Case No. 1:11-CV-00207, filed Nov. 16, 2011 (10 pages).
Opinion Regarding Parties' Motions for Summary Judgment, Civil Case No. 1:11-CV-00207, filed Nov. 16, 2011 (6 pages).
Information related to a transaction involving an Series S Cyclonator, see "Date Information" section of accompanying letter for information about the dating of this material (121 pages; pages marked PET006190 to PET006310 in sequence).
Declaration of Alan G. McCormick in Support of Defendants' Motion for Summary Judgment; *Petter Investments, Inc.* v. *Hydro Engineering, Inc.*, et al, Civil Action No. 1:07-cv-1033, Sep. 5, 2008 (141 pages).
Deposition Transcript of Matthew Petter discussing the transaction related to the Series S Cyclonator, Jul. 15, 2008 (6 pages).
Joint Chart Disclosing Claims and Defenses, *Petter Investments, Inc.* v. *Hydro Engineering, Inc., et al*, Civil Action No. 1:07-cv-1033, Aug. 1, 2008 (48 pages).
Plaintiff's Opposition to Defendants' Motion for Summary Judgment of Equitable Estoppel and Non-Infringement, *Petter Investments, Inc.* v. *Hydro Engineering, Inc., et al.*, Civil Action No. 1:07-cv-1033, Oct. 6, 2008 (92 pgs).

* cited by examiner

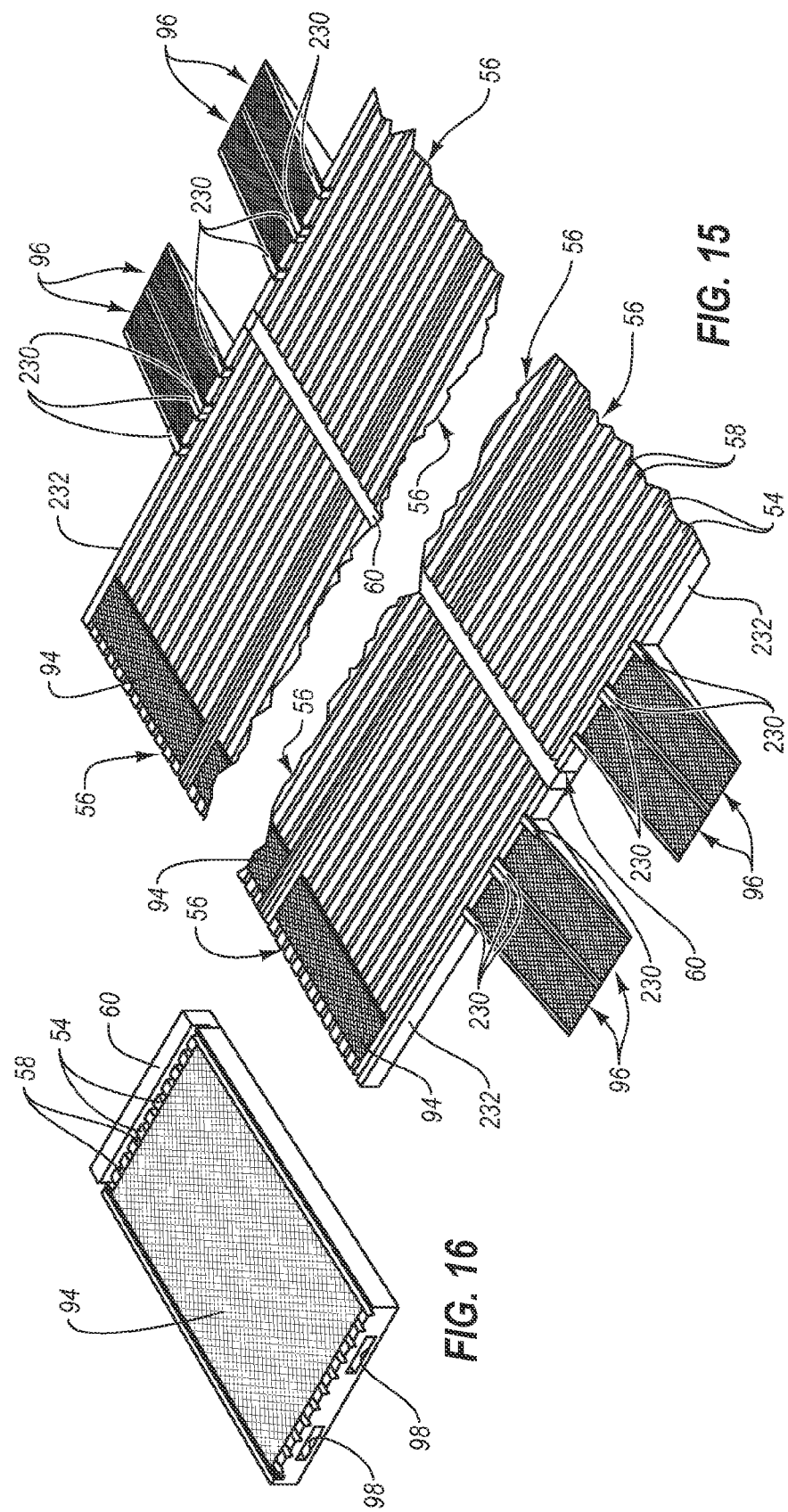

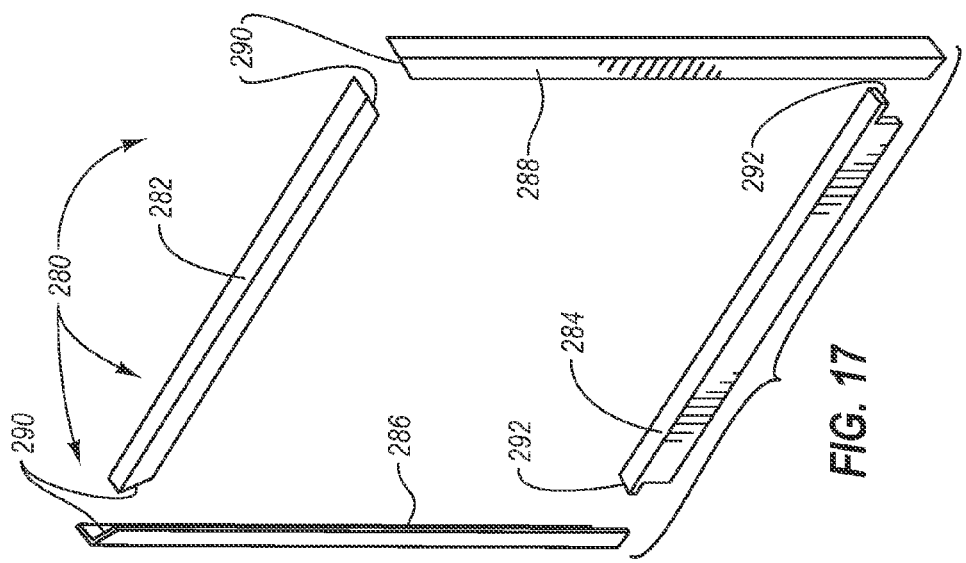
FIG. 17
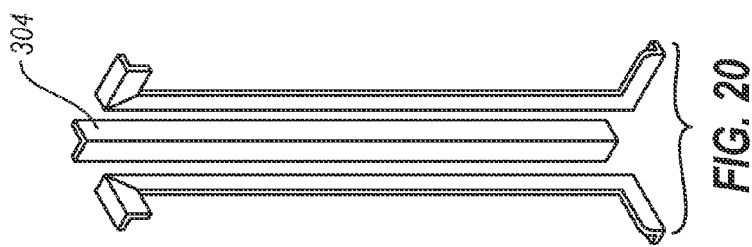
FIG. 19
FIG. 20
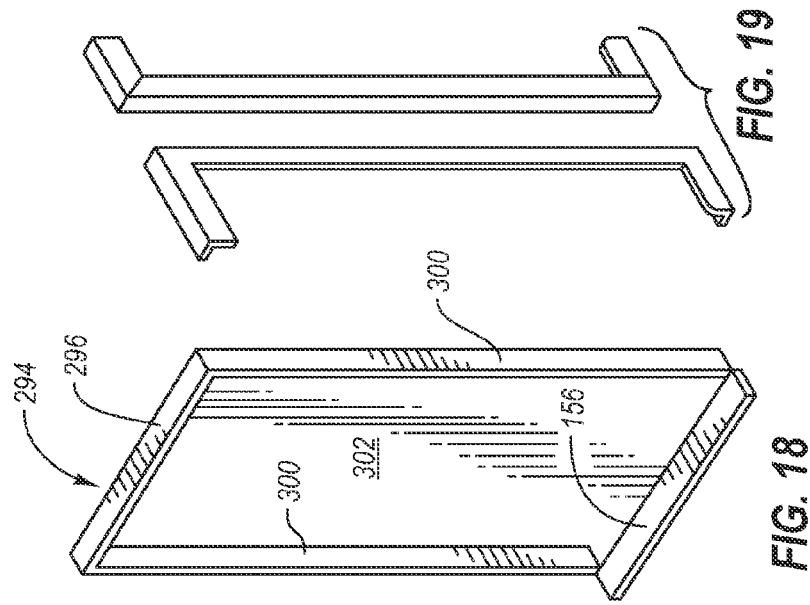
FIG. 18

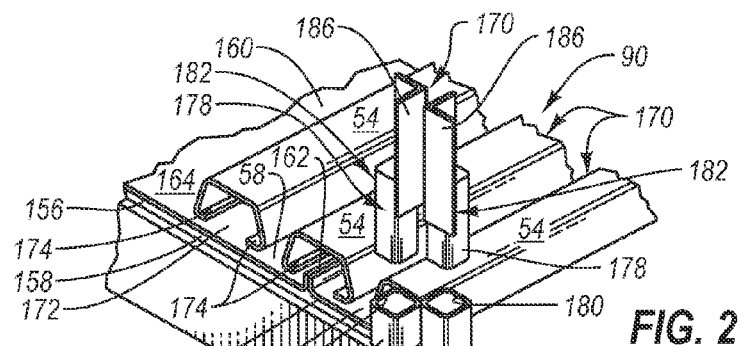
FIG. 21
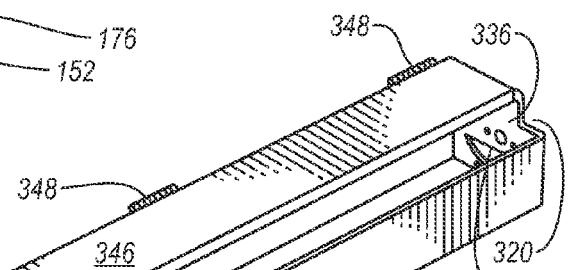
FIG. 22
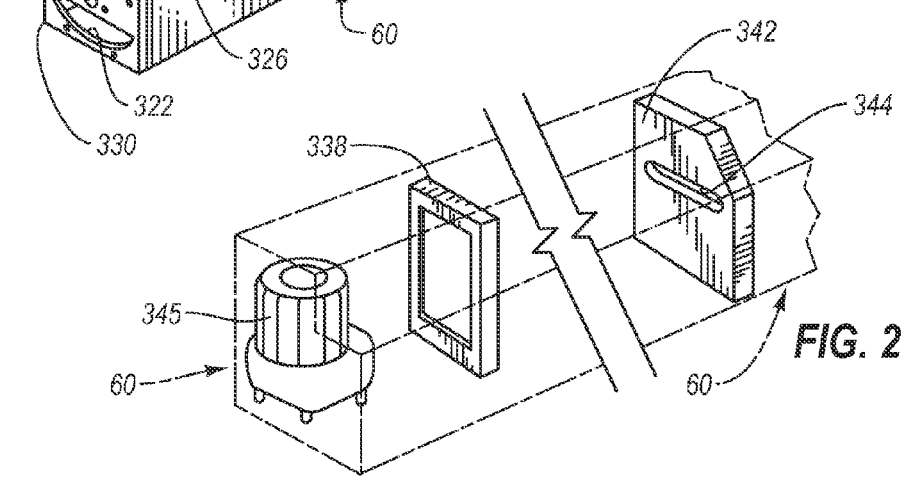
FIG. 23
FIG. 24

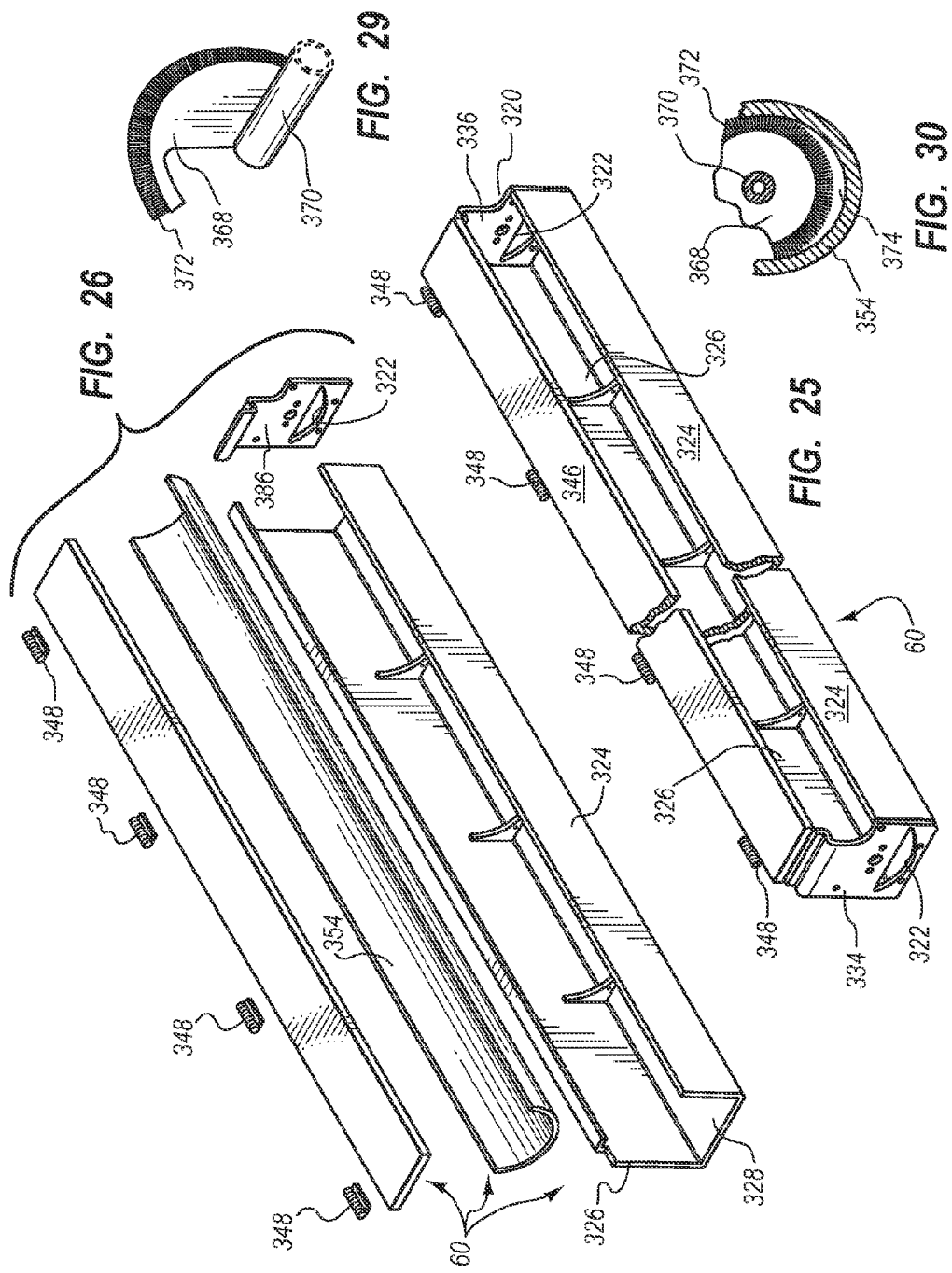

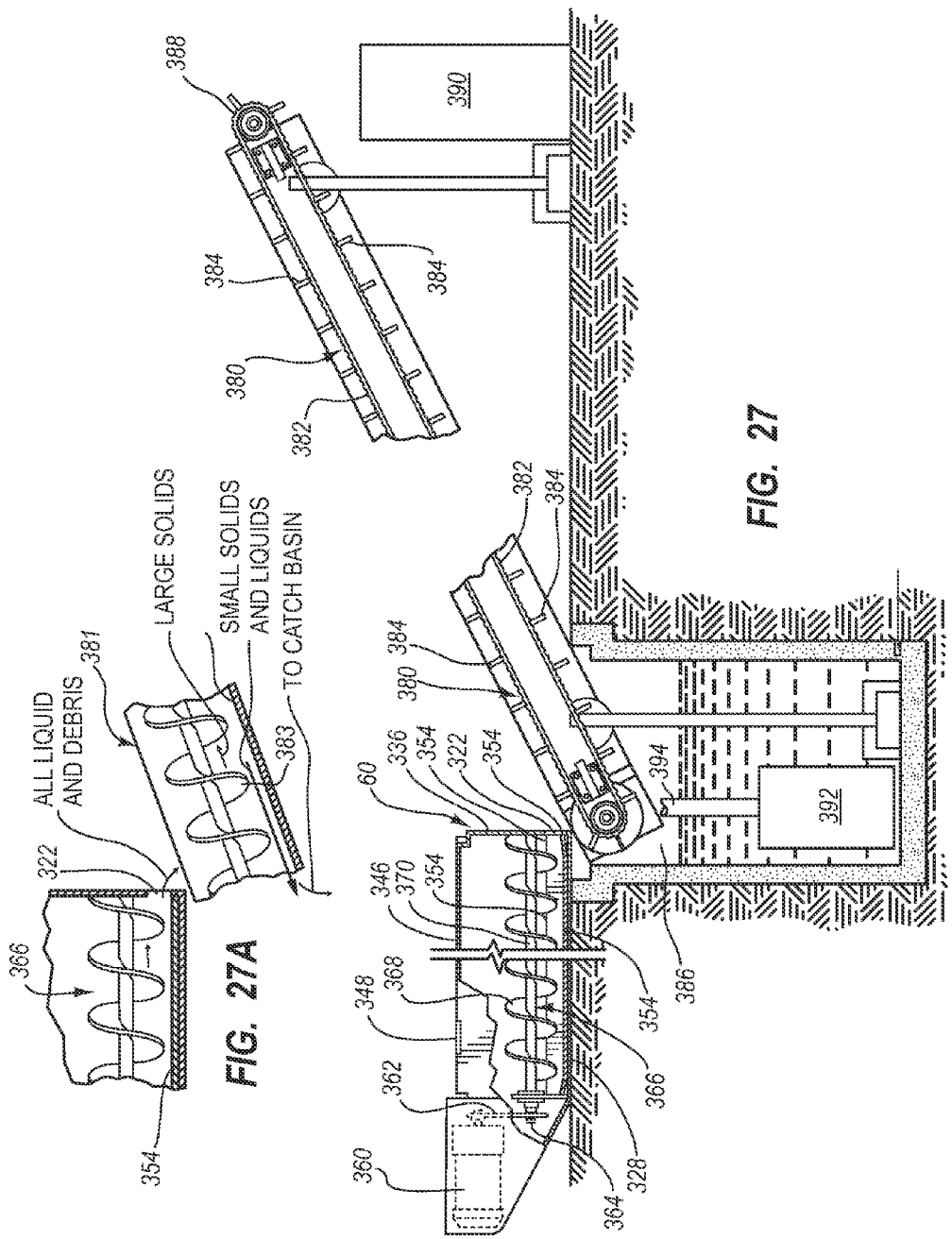

LOW PROFILE NON-CLOGGING NON-POLLUTING SURFACE TREATING PADS, ASSEMBLIES AND METHODS

This application is a continuation of our co-pending U.S. patent application Ser. No. 10/884,361, filed 2 Jul. 2004, now pending, which application is a continuation-in-part of our co-pending U.S. patent application Ser. No. 09/798,426, filed 2 Mar. 2001, now U.S. Pat. No. 6,799,591.

FIELD OF THE INVENTION

The present invention relates generally to the field of surface treating equipment including washing debris of various types from vehicles and other equipment and, more particularly, to low profile, non-clogging, pollution free pads, assemblies and related methods by which vehicles and other objects are cleaned and/or surface treated.

BACKGROUND

In the past, assemblies upon which motor driven and motorless vehicles and other equipment have been placed for washing debris from the exterior thereof have experienced problems and suffer disadvantages, among which are: (1) are complex and difficult to assemble and disassemble; (2) are not unitarily portable from location-to-location; (3) do not discharge substantially all of the removed debris from the washing site resulting in clogging of the assembly and down time to unclog; (4) do not efficiently remove, contain and control substantially all of the separated debris and all of the used wash liquid to a site remote from the washing site; (5) are labor intensive in assembling and disassembling; (6) do not allow continued washing while earlier removed and contained debris is loaded and transported to land fill or other disposal sites; (7) do not accommodate modular enlargement; (8) do not, in an effective and simplified way, segregate spent wash liquid for reused from removed and contained solid debris destined for land fill or other storage; (9) do not use only influent wash liquid to remove from the assembly substantially all debris displaced on the assembly at the washing site during the vehicle washing phase; and (10) do not provide for automated processing of contained spent wash liquid and removed and contained debris.

BRIEF SUMMARY AND OBJECTS OF THE PRESENT INVENTION

In brief summary, the present invention overcome or substantially alleviate problems of the past in respect to assemblies upon or over which motorless and motor driven vehicles and other equipment, including vehicles and other equipment of great weight and are positioned or displaced and washed to remove debris or otherwise surface treated. Debris is not limited to dirt, but can be a substance desired to be removed from the exterior and/or interior of a vehicle or other equipment. The invention also applies to surface treating of vehicles and other equipment. Surface treatment may comprise but is not limited to phosphatizing steel parts by painting. A low profile pad, usable alone or with other like pads in a module array, is provided whereby one or more motor driven or motorless vehicles and other equipment may be wheeled over gently-inclined ramps onto or across a full drainage impervious washing site such that substantially all spent wash liquid and substantially all removed debris are caused to flow away from the washing site to and be temporarily contained in an edge collector or gutter. Wheelless heavy equipment can be lifted and lowered onto and later lifted from the washing site. Thus, debris accumulation at the washing site is avoided and processing of gutter-contained spent wash liquid and removed debris can occur without interfering with ongoing washing on the washing site. Several modes for processing spent wash liquid and removed debris delivered to the gutter are available, one mode comprising automated processing. Certain embodiments of the present invention can be moved as a unit from place-to-place, without disassembly. Heating for sub freezing use is an option. Vertical walls and a roof, with and without lighted panels, if desired, to contain wash spray are included in some embodiments. Traction improving features are provided in some embodiments. Washing may be of any known type, e.g. pressure, hand, steam, automatic, and is intended to include any form of surface treatment with a liquid effluent to be removed from the pad.

With the foregoing in mind, is it is a primary object of the present invention to overcome or substantially alleviate problems of the past in respect to assemblies, and related methodology, upon or over which vehicles, including vehicles of great weight, and other equipment are positioned or displaced and exteriorly washed to remove debris or surface treated.

It is another paramount object to provide low profile vehicle wash pads, and related methods, usable individually or collectively with other like pads in a module array.

Another significant object is the provision of vehicle wash pads comprising an impervious top, and related methods, the pads being usable individually or arrayed collectively, whereby one or more motor driven or motorless vehicles may be wheeled over gently sloping ramps upon or across (or other equipment placed thereon) to provide full drainage from the top such that substantially all spent wash liquid and substantially all removed debris are caused to flow to and be confined in an edge gutter away from the washing site so that debris accumulation at the washing site is avoided.

Another object of importance is the provision of low profile wash pads, and related methods, whereby essentially all spent wash liquid and debris are displaced collectively during washing to a pad edge and into an offset gutter whereby the gutter-contained spent wash liquid and debris removal can occur without interfering with ongoing washing at the washing site.

Another object of value is the provision of wash pads, and related methods, whereby spent wash liquid and removed debris are displaced to an edge gutter and processed.

A further object of the invention is the provision of low profile vehicle wash pads, and related methods, which can be used alone or together in a module array and where individual pads can be unitarily moved from place-to-place without disassembly.

Additional objects of primary importance is to provide vehicle wash pads having one or more of the following features: (1) non-complex and easy to manufacture (2) are individually unitarily portable from location-to-location without disassembly; (3) causes discharge substantially all of the removed debris from a washing site thereby preventing clogging of the assembly and down time; (4) efficient in the removal, containment, and control of substantially all of the separated debris and used wash liquid; (5) are not labor intensive in assembling and relocating; (6) allow continued washing while earlier removed and contained debris is loaded and transported to land fill or other disposal sites; (7) accommodate modular enlargement; (8) provide, in an effective and simplified way, segregation of spent wash liquid for reused from removal and contained solid debris destined for land fill or other storage; (9) use only influent wash liquid to remove from the impervious top of the assembly substantially all debris displaced thereon during the vehicle washing phase; (10) provides automation for the discharge and processing of contained spent wash liquid and removed and contained debris; (11) provides for drive through washing of debris from vehicles; (12) provides for heating of the wash pad and gutter for operation in sub-freezing conditions; (13) provides anti-freezing features for cold temperature use, (14) provides for wall and, if desired, ceiling confinement of random wash spray; (15) provides for illumination of wash process by wall and/or ceiling installed light panels; and (16) provides for improved traction for vehicles and/or operators.

BRIEF DESCRIPTION OF THE DRAWINGS

FIGS. 12-15 illustrate how vehicle wash pads in accordance with the present invention may be used alone or in a modular array in conjunction with one or more sets of ramps;

FIG. 16 is a perspective of a single vehicle wash pad in accordance with the present invention with expanded metal grating superimposed over an undulating top element;

FIGS. 17-20 are enlarged perspectives illustrating one manner in which spray-confining walls may be constructed for peripheral placement around to extend above vehicle wash pads, in accordance with the present invention;

FIG. 21 illustrates one way in which vertical spray containing walls may be securely connected to a vehicle wash pad in accordance with the present invention at a corner where the collective wall forms a 90 degree angle;

FIG. 22 illustrates in perspective one form of gutter to which substantially all spent wash liquid and removed debris is displaced for containment and processing;

FIG. 23 is a fragmentary perspective showing a filter and as a sump pump within the gutter of FIG. 22 by which liquid is clarified and, thereafter, removed from the gutter;

FIG. 24 is a fragmentary perspective of a weir which placed in the gutter of FIG. 20 for assisting in clarifying liquids from solids deposited therein;

FIG. 25 is another form of gutter to which essentially all of the spent wash liquid and removed debris is directed at an edge of a vehicle wash pad in accordance with the present invention;

FIG. 26 is an exploded perspective of the gutter of FIG. 25;

FIG. 27 is a side elevation view of equipment by which removed debris and spent wash liquid in the gutter of FIG. 25 may be processed;

FIG. 27A is a fragmentary cross section of a second drainage conveyer system embodying principles of the present invention;

FIG. 29 is an enlarged fragmentary perspective of a part of the auger or screw conveyer illustrated in FIG. 27; and FIG. 30 is a cross section illustrating the relationship between the interior of the gutter of FIG. 23 and the screw conveyer of FIG. 25;

DETAILED DESCRIPTION OF THE ILLUSTRATED EMBODIMENTS

The present invention is directed toward the provision of low-profile, non-clogging, pollution free wash pads, assemblies, and related methods by which vehicles and other objects are cleaned using a wash liquid or surface treated. All types of vehicles, including vehicles and other equipment of great weight, are accommodated on a single pad or an array of pads, either in a fixed position or displaced there while all or selected portions of the exterior or interior of the vehicle and other equipment are washed to remove debris. The vehicles and other equipment may be motor driven or motorless and include, but are not limited to, tractor-trailer rigs. The present invention causes substantially all spent and/or surface treating liquid and all substantially removed debris to flow collectively from the washing site as a direct result of washing on top of the pad or pads into an edge collector where this drainage is temporarily contained. Thus, the washing and/or surface treating phenomenon on top of the pad or array of pads may occur simultaneous with processing of gutter-contained spent surface cleaning or treating liquid and removed debris at the edge collector. The collected liquid and debris may be processed in any one of several ways, including but not limited to mechanical displacement and segregation, with or without biological absorption, which may include reclaiming and reusing of the liquid.

An advantage of the present invention is that low-profile washing pads are provided which may be individually moved unitarily from place to place without disassembly, for example, by use of a forklift. Other features may comprise spray containing vertical walls, with or without a ceiling, heating for use in sub-freezing temperatures, illumination, ventilation and improved surface traction for vehicles and/or operators.

Figure 1:
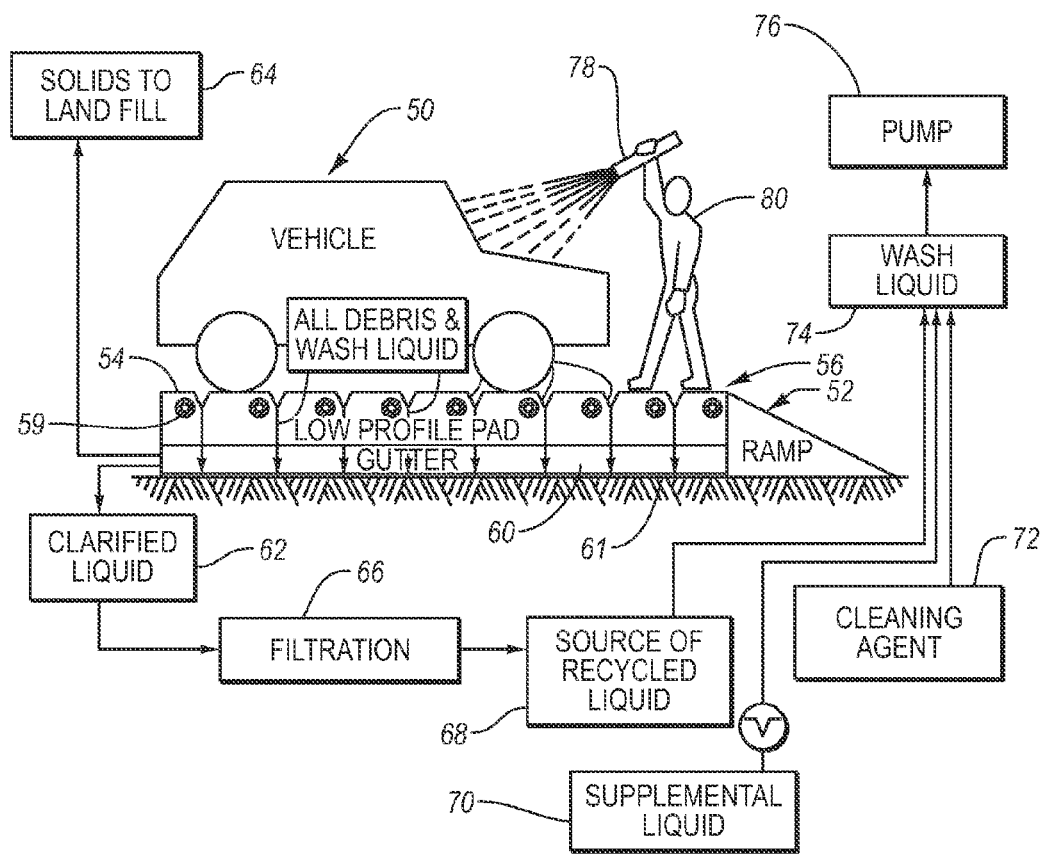
FIG. 1 is a schematic, diagrammatically illustrating certain features of the present invention.

Reference is now made to the drawing wherein like numerals are used to designate like parts throughout. Specifically, FIG. 1 diagrammatically illustrates features provided by the present invention whereby a vehicle, generally designated 50, is displaced up a gently inclined ramp, generally designated 52, so as to rest upon the top surface 54 of a low profile wash pad, generally designated 56. The top element 54 of the wash pad 56 is impervious so that substantially all wash liquid and substantially all of the debris removed from the vehicle 50 flow as drainage to gently sloped flow path defining channels 58 and thence into an edge gutter 60 located below the pad 56 along one edge thereof, but offset from the washing site. Channels 58 accelerate the flow or drainage. Accordingly, with the present invention, there is no material accumulation of debris of any type on pad 56 and the gutter or collector 60 becomes a temporary repository for the drainage.

In any one of several ways, the drainage displaced into the gutter or collector 60 is segregated into clarified liquid 62 and particulates or solids 64. The segregated solids 64 are typically transported to and deposited at a suitable landfill site, consistent with governing environmental requirements. Clarified liquid 62 is recycled using filtration 66 to create a source of recycled liquid 68 or pretreated for discharge to sanitary sewer or other approved disposal method. Recycled liquid 68, supplemental liquid 70, as needed, and cleaning agent 72 are combined to form wash liquid 74, to which pressure via pump 76 is applied to deliver the pressurized wash liquid 74 to spray nozzle 78 shown as being hand held by an operator 80 standing on the pad 56. The operator directs the washing spray from nozzle 78, as desired, upon any and all desired areas of the exterior of the vehicle to clean the same. The operator 80 may also utilize hand held manual scrub brushes, hand held mechanical scrub brushes, sponges, shammies or any other item useful in assisting in the removal of substantially all of the debris from the exterior locations of vehicle 50. Washing, however, may be of any known type, e.g. pressure, hand, steam, automatic, etc.

When the wash pad 56 is utilized during sub-freezing temperatures, the top element comprising support surfaces 54 and flow channel grooves 58 may be heated in any desired way such as by heating tubes or coils 59 placed contiguous therewith. A heated fluid of suitable temperature may be caused to flow through tubes 59 in order to maintain the temperature of the top element 54 of wash pad 56 above freezing. Likewise, the gutter 60 may be equipped with a heater 61 of any suitable type, including but not limited to, one or more tubes through which a heated fluid is caused to flow so that water delivered to the collector 60 is maintained above freezing.

Figure 2:
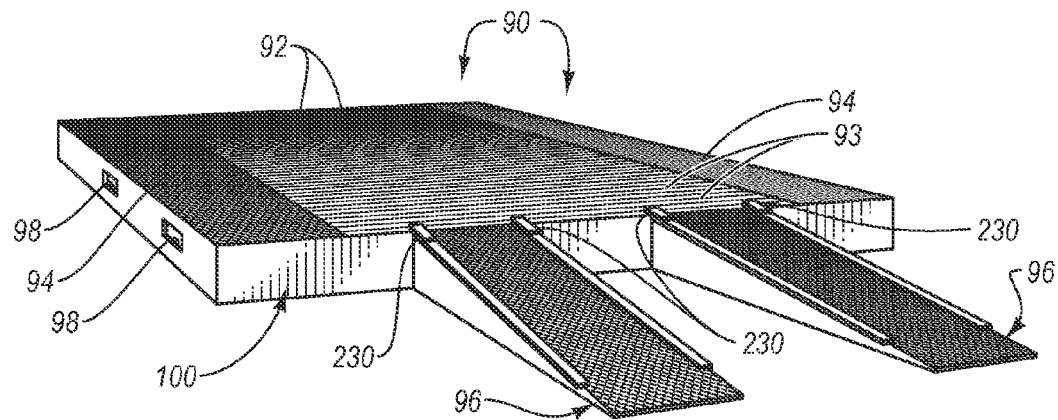
FIG. 2 is a perspective of a unitary, low profile vehicle wash pad in accordance with the present invention.

Reference is now made to FIG. 2 which illustrates a single pad embodiment of the present invention, generally designated 90. Single pad 90 comprises a top impervious undulating surface 92 comprised of alternating ridges or rails 92 and grooves or flow channels 93 whereby the ridges 92 are self cleaning and support a vehicle and/or other objects and the grooves 93 accommodate flow of drainage comprising substantially all of the spent wash liquid and substantially all of the removed debris to a collector or gutter (not shown) disposed below the grooves 93 and under one edge of the pad 90. While not required, to facilitate improved traction for human operators, side walkways 94 of expanded metal grating may be utilized. If desired, the entire top surface 92 may be covered by expanded metal grating, which comprises large enough openings so that substantially all of the spent wash liquid and substantially all removed debris pass through the grating 94 and into the grooves of top 92 and thence into the collector. The vehicle is ramped onto and off from the impervious top 92 of the pad 90 utilizing gently inclined, but low profile ramps 96. Ramps 96 are illustrated as being secured to the pad, but removable. Permanent ramps could be provided. Ramps 96 are described in greater detail below. The pad may be set below grade, thereby eliminating the need for ramps.

The pad 90 may be placed upon a flat surface, such as a floor within a building or a paved parking lot. Alternatively, pad 90 may be placed upon a generally flat area of ground. The surface 92 is very gently sloped to one edge to accommodate the above-mentioned flow of drainage in the grooves 93 and thence into the collector. Although not presently preferred, this may be achieved by manufacturing pad 90 so that, when on a level surface, impervious top 92 has the desired gentle slope. In the alternative and preferably, top 92 may be manufactured so as to be horizontal when pad 90 is horizontal, in which case the surface upon which the pad 90 is placed to accommodate vehicle washing must supply the gentle slope required for flow of drainage through the grooves into the collector.

When it is desired to move pad 90 from one location to another, normally the removable ramps 96 are lifted manually or by using a hand truck or a forklift. The lifting disconnects each ramp 96 from the pad 90. The pad 90 is thereafter lifted as a unit without disassembly using a suitable machine, for example, a forklift whereby the forks of the forklift are inserted through properly spaced slots 98 in the frame 100 of pad 90.

Figure 3:
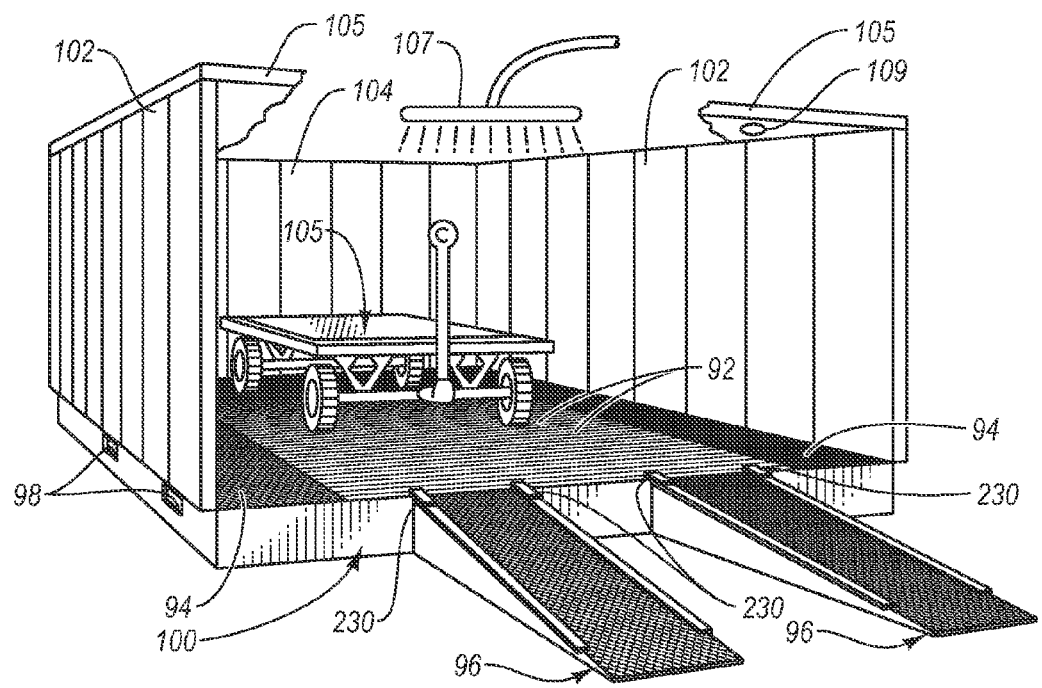
FIG. 3 is a perspective similar to FIG. 2, further illustrating peripheral walls by which stray spray is contained.

Reference is now made to FIG. 3 which illustrates once more the single pad 90, constructed as described above, to which two side walls 102 and one end wall 104, constructed in any suitable way, have been added to contain the sprayed wash liquid to a region directly above the pad 90. Side walls 102 may be utilized with or without end wall 104 in configurations, where, for example, the pad 90 is used as a drive through pad. Walls 102 and 104 are desirable when the pad 90 is utilized within a building where other work is ongoing immediately adjacent to the pad 90 or out of doors where stray wash liquid spray needs to be confined and contained.

Walls 102 and 104 will be described hereinafter in greater detail. Walls 102 and 104 may be of any suitable size to serve their intended purpose as determined by those skilled in the art. Walls 102 and 104 should be of material which does not corrode or deteriorate when exposed to wash liquid and debris removed from vehicles and other objects.

If desired a ceiling 105 may be superimposed above the pad over the walls 102 and 104 to insure that liquid and debris are not discharged over the walls beyond the wash region. Illumination 107 of a commercially available type may be provided as desired, with and without walls and with or without a ceiling. Vacuumized ventilation at 109 may also be provided.

A motorless vehicle 105 having been or to be washed is shown in FIG. 3, resting on some of the support surfaces 92 of low profile pad 90, after having been displaced up spaced low profile, locked but removable ramps 96.

Figure 4:
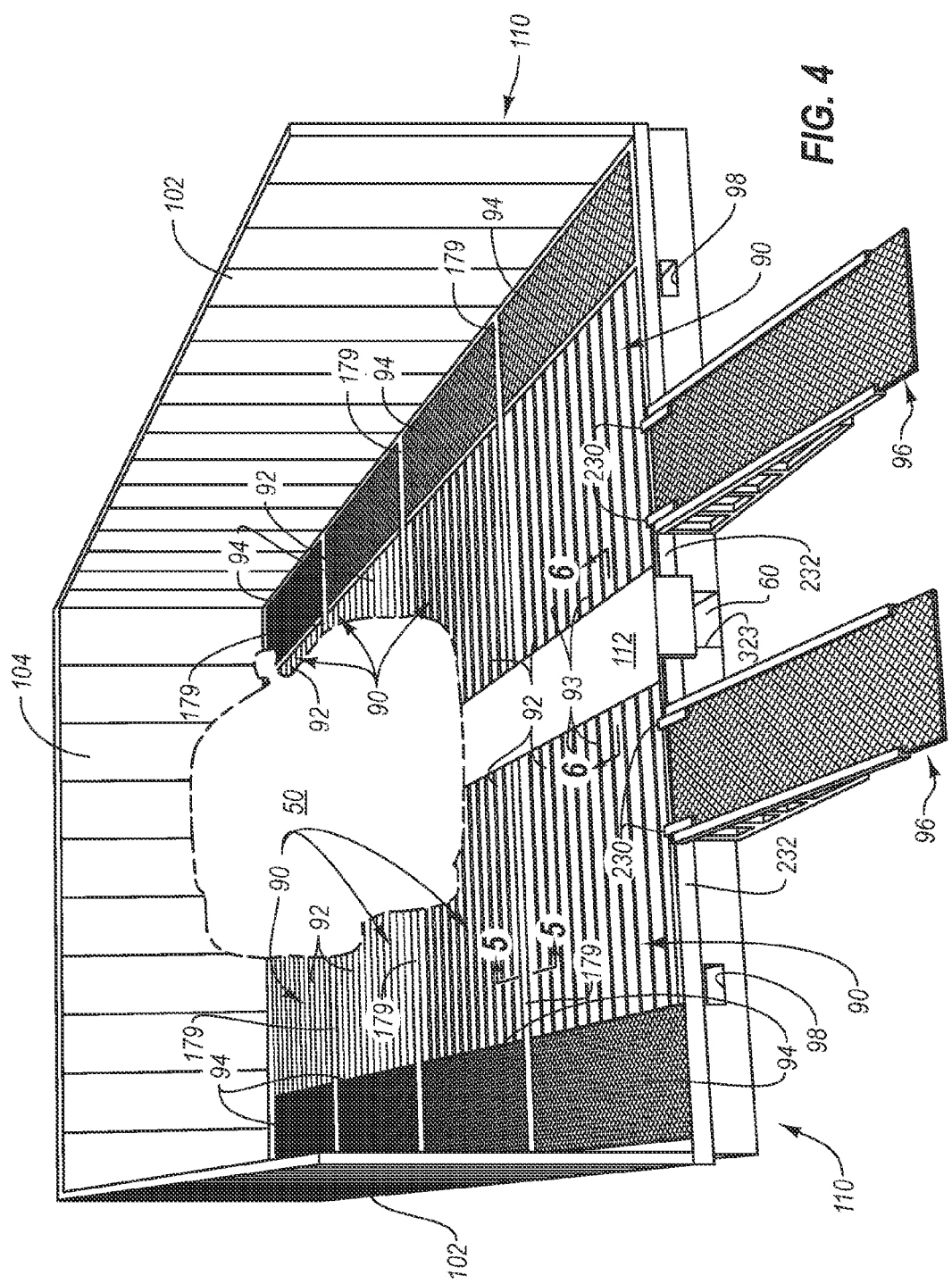
FIG. 4 is a perspective of an array of modularly combined vehicle wash pads assembled in edge-to-edge relation and further comprising edge walls for containing stray spray.

Reference is now made to FIG. 4 which illustrates a modular array, generally designated 110, formed of a plurality of pads 90, placed edge-to-edge on a suitable surface or on the ground. A cap rail 179 covers the interface between successive pads in the direction of travel. Since each pad is illustrated as being pad 90, no further description of any of the pads of FIG. 4 is deemed necessary, with one exception. The forklift slots 98 are illustrated as being juxtaposed to the previously mentioned ramps 96 so as to be perpendicular to the ridges 92 and grooves 93 rather than parallel.

Drainage could be accommodated using two side edge collectors 60, by sloping the array 110 slightly in opposite directions from the center thereof. However, in the illustrated embodiment of FIG. 4, a central collector 60 is provided so that the pads 90 illustrated to the right in FIG. 4 are sloped slightly toward the left or toward the center of the array 110 and the pads 90 to the left as shown in FIG. 4 are sloped slightly to the right or toward the center. Accordingly, substantially all of the wash water and the debris removed from the vehicle 50 flow to the center of the array 110 and into the central gutter or collector 60 for containment and ultimate segregation between solids and liquid, as explained herein in greater detail. The collector 60 is illustrated as comprising a lid or cover 112.

By utilizing unitary individual pads 90 to form arrays of various configurations, the size of the wash site can be expanded axially and/or transversely to accommodate vehicles and other equipment larger than can be accommodated with a single pad. An array also accommodates, in certain embodiments, a drive through approach to utilizing pads in accordance with the present invention to wash vehicles, large and small, as the vehicles are successively displaced across the array of pads. In some circumstances, a single pad will accommodate a unidirectional drive through approach.

Walls 102 and 104 extend in vertically erect positions around three sides of the perimeter or periphery of the array 110 so as to contain misdirected sprayed wash liquid to the region immediately above the array 110. A roof or ceiling 105 (shown in FIG. 3) is optional as is the provision of lighting 107 and/or ventilation 109.

Simply stated, vehicle 50, shown in FIG. 4, is wheel displaced in a reverse direction onto the top surfaces 92 of the array 110 so that the four wheels of vehicle 50 rest, as illustrated, on four separate pads 90. Washing may be accomplished in any suitable way, including, but not limited to the mode illustrated in FIG. 1, with substantially all of the wash liquid and substantially all debris removed from the vehicle 50 flowing collectively as drainage along the grooves 93 between top surfaces 92 of the pads 90 into the central collector 60.

Portable ramps 96 accommodate ramping of the vehicle 50 onto and, after being washed, off from the array 110.

Figure 6:
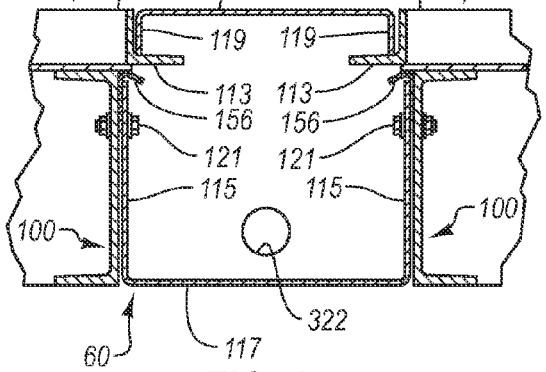
FIG. 6 is an enlarged fragmentary cross section taken along lines 6-6 of FIG. 4.

Reference is made to FIG. 6 which illustrates the central gutter 60 and its coverplate 112. Coverplate 112 is inverted U-shaped in cross section and simply rests on its side flanges 119 on opposed angle supports 113 and can be manually lifted for access to the interior of the collector 60. Angle supports 113 are connected, as by welding or in any other suitable way, to opposed aligned pads. The top surface of the coverplate 112 is illustrated as being flush with the vehicle support surfaces 92.

As stated before, the flow is toward the center and into gutter 60 from all pads of the array illustrated in FIG. 4. Drainage from each groove 93 falls by force of gravity into the gutter 60, which comprises parallel side walls 115, spaced from each other a distance greater than the distance between the two adjacent top elements of opposed wash pads so that all drainage falls into the hollow interior of the gutter 60. A circular discharge hole or other configuration 322 is disposed at one end of the gutter 60 of FIG. 6. The other end comprises a rectangular opening 323. See FIG. 4. Openings 322 and 323 may of be any type providing an outlet.

The side walls 115 are integrally connected to a bottom wall 117 (FIG. 6) so as to define a leak proof container permitting flow only from opening 323. Typically a sump pump or like mechanism is associated with the lower end of the gutters or collectors 60 of FIGS. 6 and 22.

Collector walls are illustrated as being respectively connected by bolts or rivets 121 to the frames 100 with which they are contiguous. Drip edges 156 are provided above each wall 115.

Figure 7:
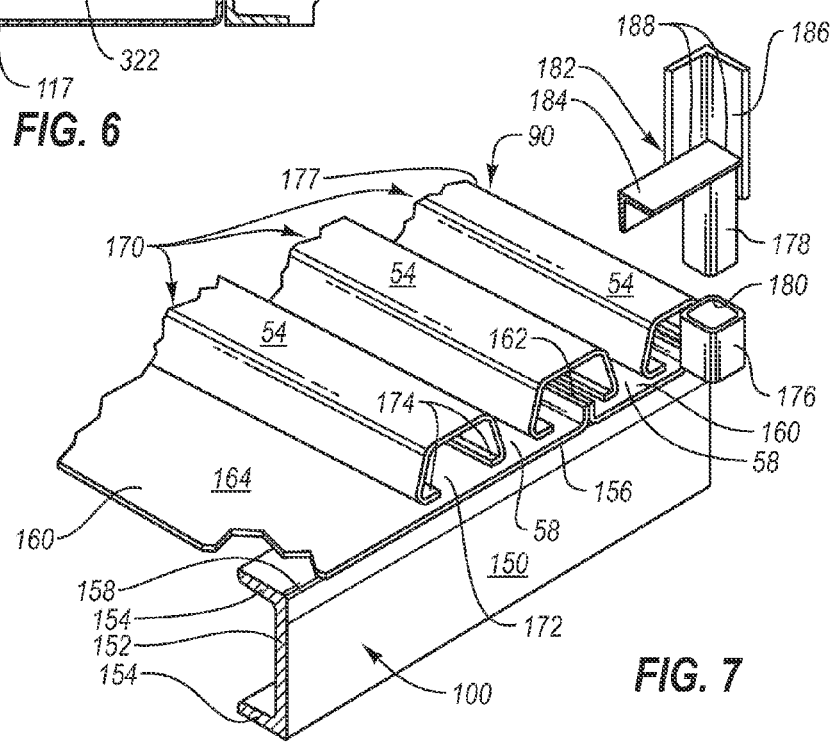
FIG. 7 illustrates one way by which impervious low profile vehicle wash pads in accordance with the present invention may be fabricated and also showing male/female connectors for placement of the peripheral walls of FIG. 3.

Reference is now made to FIG. 7, which illustrates one way of forming or fabricating a wash pad 90 in accordance with the present invention. The assembly 90, as fragmentarily depicted in FIG. 7 must have substantial load bearing strength under circumstances where the pad 90 is called upon to carry substantial weight, such as when earth moving equipment is displaced thereon and retained there for the purpose of removing debris from the exterior thereof. Because the wash liquid often comprises water (but not necessarily so), it is important that the pad 90 of FIG. 7 not be subject to rust. Thus, the elements forming the assembled pad 90 (FIG. 7) may be formed of rolled sheet steel, which elements or components are coated with an anti-corrosion material, such as acrylic, high-molecular weight polyurethane, baked polymeric or other paint or any other suitable substance. The elements themselves may also be comprised of high strength synthetic resinous materials, provided the strength is adequate to support the load, which eliminates any need for a coating.

As mentioned before, the wash pad 90 comprises a substructure support in the form of a rigid frame 100 circumscribing the underside of the perimeter of the pad 90. As illustrated in FIG. 7, the frame 100 comprises channel members 150, the web 152 of which is illustrated as being vertically directed, while the spaced flanges 154 are generally horizontally directed. The lower flange 154 is illustrated as being surface or ground engaging. The channel elements 150, forming the frame 100, may extend along and help define the edges of the pad 90, with the channels 150 being secured one to the next at their points of intersection, using, for example, a weldment, where the channels 150 are formed of steel. The channel 150 located at the low drainage edge of the pad 90 is shown as being equipped with a drip edge member 156 secured at site or interface 158 to the web 152 as by welding so that essentially all drainage from the flow channels 93 is deposited by gravity and force of flow into collector 60 (not shown in FIG. 7) disposed immediately below the drip edge 156. One or more plates 160, formed of steel, for example, having a suitable thickness to provide ample strength, are contiguously superimposed over the top surface of top flanges 154 of each channel 150 so as to entirely cover the hollow region within the channels 150. The plate 160 may be a single sheet of steel, for example, or a series of sheets suitably connected as, for example, at lap joint 162, shown in FIG. 7. The top surface 164 of the plate or plates 160, at selected locations, define the grooves or flow paths 93, for the purpose explained above.

The ridges 54, upon which the vehicle is supported before, during and after the washing phase are defined by a series of spaced inverted generally U-shaped members 170. Each U-shaped member 170 comprises not only a flat ridge piece region 54, but a hollow concealed interior 172 and oppose inwardly directed flanges 174, where each inverted U-shaped member 170 is rigidly connected to the associated plate 160, as, for example, by welding.

In circumstances where a wall 102 is desired above drip edge 156, a vertically directed hollow collar 176 of limited length is provided. Collar 176 is suitably secured in any satisfactory way to the pad 90, such as by welding, so as to be rigidly positioned as illustrated in FIG. 7. This accommodates removable receipt of a suitably dimensioned and shaped downwardly directed wall post 178. Post 178 is downwardly appended to a wall frame 182, forming a part of wall 102 and further comprises a horizontal angle member 184 and a vertical angle member 186 rigidly connected together and to post 178, for example by welding, at sites 188.

It is to be appreciated that pad 90 can be constructed in any one of many ways, the embodiment of FIG. 7 being only one of those ways.

FIG. 21 illustrates the manner in which a corner of the wash pad 90 of FIG. 7 may be equipped so as to provide two post receptacles 176 at one corner to accommodate support at the end of one wall 104 in the longer of the two post receptacles 176 and support of a second wall 102, perpendicularly disposed in respect to wall 104, via the shorter of the two post receptacles 176. Both collars 176 are secured to the pad 90 in any suitable rigid fashion, such as by welding.

Figure 5:
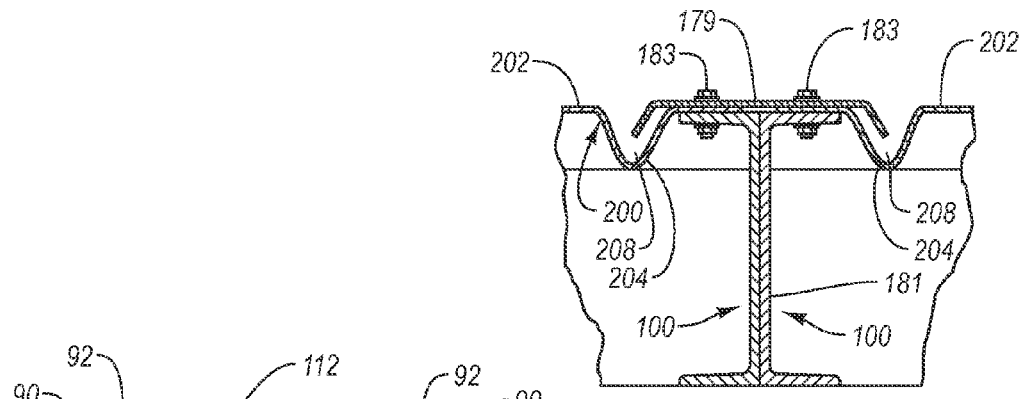
FIG. 5 is an enlarged fragmentary cross section taken along lines 5-5 of FIG. 4.

With continued reference to FIG. 21, in situations where an array of wash pads are going to be used in a given installation so that there are at least two pads in the direction of travel, the other hollow post receptor 176, as shown to the right in FIG. 21, is eliminated. The last vehicle supporting ridge 54 comprises an end wall 177, which is generally vertical and flush with the lower frame 60. The second of the two axially consecutive pads is similarly constructed so that the leading edge of the frame 100 of the first pad is contiguously flush with the trailing end of the frame 100 of the second pad, in the manner shown in FIG. 5. While fastening the two pads together, using conventional fasteners is an available option, ordinarily such is not required since the overall weight of each pad will preserve the contiguous relationship at interface 181 between the leading end of one and the trailing end of the other. If desired, a U-shaped canopy and or cap rail 179 (FIG. 5) may be positioned over the interface between the two contiguous pads and bolt secured at 183 to prevent flow of wash liquid and/or debris into the interface 181.

Figure 8:
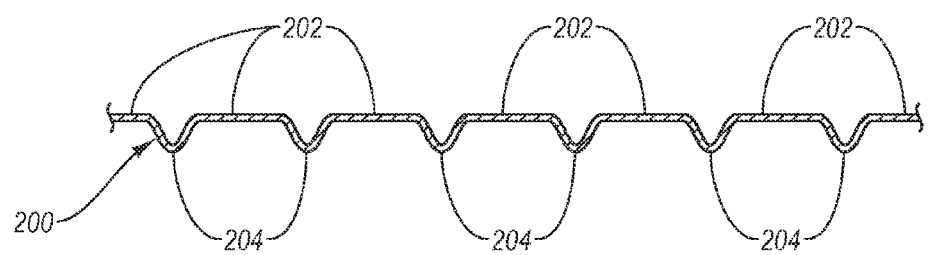
FIG. 8 is a cross section of a modified impervious top surface-defining element usable in fabricating vehicle wash pads in accordance with the present invention.
Figure 9:
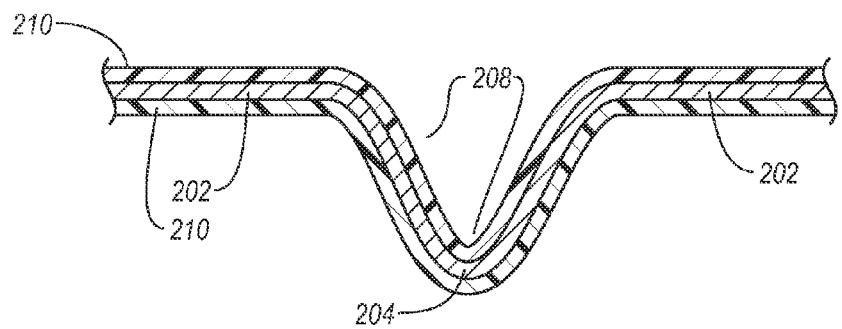
FIG. 9 is an enlarged fragmentary cross section showing, in greater detail, the elevated vehicle supporting segments and the flow-defining channels of the top surface-defining element of FIG. 8.

Reference is now made to FIG. 8, which illustrate a further wash pad embodiment in accordance with the principles of the present invention. More specifically, in lieu of the top element of the pad 90 shown in FIGS. 7 and 21, the top element generally designated 200 in FIG. 8, comprising one piece, may be used. Top element may be formed of stainless steel. Alternatively, as shown in FIG. 9, top element 200 may be an anti-corrosion coated sheet of steel having a satisfactory thickness and strength to be placed over the frame 100 to provide ample support for vehicles displaced onto, across and off a wash pad comprising top element 200. Top element 200 may be formed by rolling a flat sheet of stainless steel through a roller mill to create the configuration shown in FIG. 8. Where the rolled top element 200 is formed of steel capable of oxidation, it may be coated, as shown in FIG. 9, to obviate erosion due to atmospheric exposure, wash liquid and debris removed from vehicles and other objects cleaned on the wash pad comprising top element 200, in accordance with the present invention.

Top element 200 comprises a plurality of spaced flat ridges 202 interrupted by V-shaped flow path defining grooves 204, each exposed between successive ridges 202. While illustrated as being of uniform size in FIGS. 8 and 9, the ridges 202 and the grooves or flow channels 204 may be of non-uniform size and/or spacing, if desired. The function of the top element 200 is to provide an impervious layer by which ample support strength is available for vehicles and other items, including heavy vehicles, in such a way that the wash liquid utilized to remove debris from the vehicle and/or other equipment and substantially all of the removed debris flow along flow paths 208 (FIG. 9) defined by the V-shaped grooves 204 at an accelerated velocity to one edge of the wash pad and thence into collector 60. It is to be noted that the anti-corrosion coating 210 mentioned above is illustrated on both sides of element 200 in FIG. 9.

The top element of wash pads in accordance with the present invention may comprise other shapes and configurations by which substantially all wash liquid and substantially all removed debris flows as drainage from the top element of the pad to a collector or gutter.

Gently inclined ramp 52 (FIG. 1) may be of any suitable low profile configuration by which the vehicle may be ramped onto and/or off a wash pad 56. While ramps may be used which are integrally fastened to the edge of a wash pad, it is presently preferred, for mobility purposes, that the connection between the ramp 52 and the wash pad be reliable but releasable, accommodating placement and intentional removal of the ramp only as desired. It is also helpful for the ramp 52 to be connected to an edge of the pad in such a fashion that it may be machine lifted into and removed from its releasable association with a wash pad.

Figure 10:
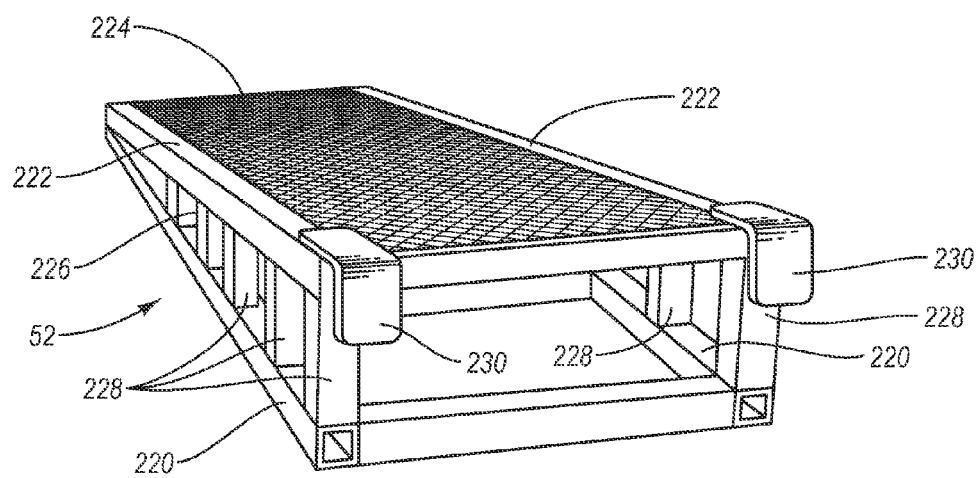
FIG. 10 is a perspective of one type of removable and portable ramp by which vehicles are rolled between the ground and one or more wash pads of the present invention.

One suitable ramp 52 is illustrated in FIG. 10. It comprises a flat base 220, shown as being rectangular in configuration and comprising longitudinally directed structural members and transverse structural members connected together as by welding. The ramp 52 of FIG. 10 also comprises top structure which is inclined or angularly disposed so as to be near the ground at one end and of ample height at the other to have essentially the same elevation as the top of the wash pad with which it is associated. The top structure 222 is likewise formed of longitudinal and cross members with expended metal grating 224 superimposed thereon to provide improved traction. The angle 226 between the base 220 and the top structure 222 is selected to provide a fit between the ground and the top of the wash pad as shown in FIG. 1.

Vertical columns 228 of varying length provide for a transfer of load from the top structure 222 to the base 220. The open frame nature of the ramp 52 of FIG. 10 accommodates placement and removal of the entire ramp as a unit utilizing a forklift, the prongs of which may be inserted between the columns 228. At the higher end of the ramp of FIG. 10, opposed L-shaped hooks 230 are provided with one leg of each being secured as by welding to the corners of the upper or top structure 222 so as to provide a space between the upper structure 222 and the other, downwardly directed leg of each hook 230. The hooks 230 are lowered over an edge bar 232 of the associated wash pad (FIG. 4) to secure the ramps to the wash pad so as to avoid inadvertent separation during use.

Figure 11:
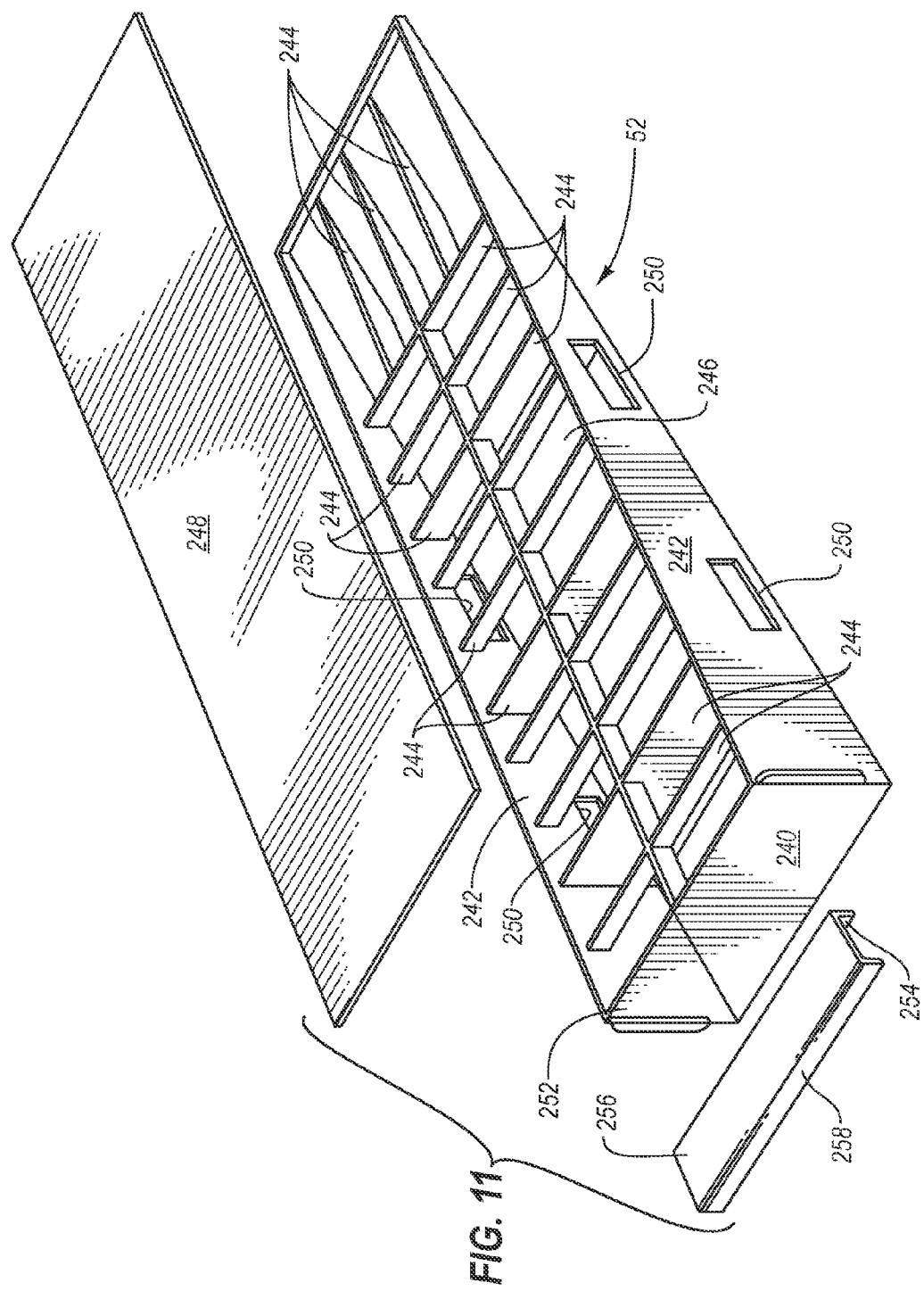
FIG. 11 illustrates in enlarged exploded fragmentary perspective another type of ramp in accordance with the principles of the present invention, by which vehicles can be wheeled onto and off vehicle washing pads.

In lieu of the wedge-shaped ramp 52 of FIG. 10, other forms of ramps may be utilized, one of which is illustrated in FIG. 11. Ramp 52 of FIG. 11 is likewise wedge-shaped and comprises a rectangular proximal end formed of a plate 240, triangular side plates 242 and interior reinforcing lattice of rectangular structural members 244. The lattice interior frame 244 is enclosed by the side wall plates 242, a bottom rectangular plate 246 and a top rectangular plate of similar size 248. The components forming the wedge-shaped ramp 52 of FIG. 11 are preferably of steel and are welded together at each interface between components.

The side walls 242 are illustrated as being equipped with forklift apertures 250 whereby the ramp 52 of FIG. 11 may be unitarily lifted away from an associated pad and moved by a single machine from place to place without disassembly.

The height of the proximal end 242 is selected to match the height of the wash pad with which it is to be associated. A top portion of proximal end 240 at site 252 contiguously receives flange 254 of a transverse channel 256 in connected relation, such as by welding. Thus, channel web 256 cantilevers away from end 240 such that a second flange 258 may be hooked over and, therefore, releasibly secured to an edge bar of a wash pad. This is similar to hooking flange 258 over the bar 232, shown in FIG. 4.

While top plate 248 is illustrated as being solid, it could be replaced by expanded metal grating. In the alternative, expanded metal grating could be superimposed over plate 248.

Figure 12:
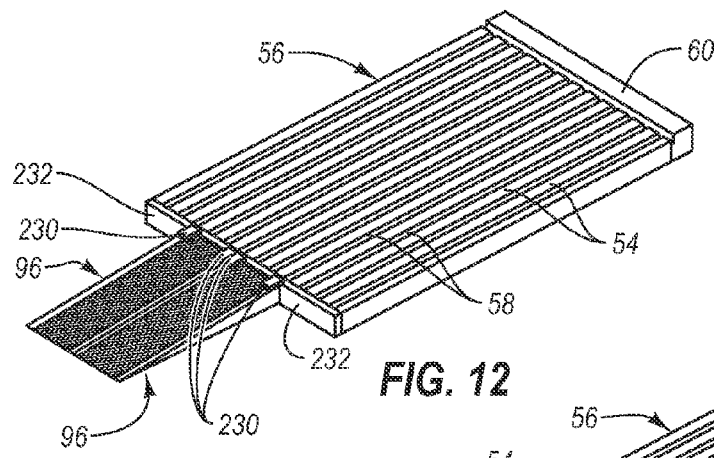

Reference is now made to FIGS. 12 through 15 which illustrate various ways one or more wash pads, in accordance with the present invention, may be used individually and collectively to provide for washing of debris from vehicles and other objects. FIG. 12 illustrates utilization of a wash pad 56 in accordance with the present invention where the undulations comprising surfaces 54 and channels 58 run in the direction of vehicle movement onto and off from the pad 56. Drainage is from left to right along a gentle slope to collector 60. The ramps 96 of FIG. 12 are illustrated as being removably placed next to each other and hooked to one edge of the pad to accommodate vehicles having a short transverse distance between wheels. Specifically, the hooks 230 of the ramps 96 extending over the wash pad bar 232, preventing inadvertent separation but accommodating removal as desired.

Figure 13:
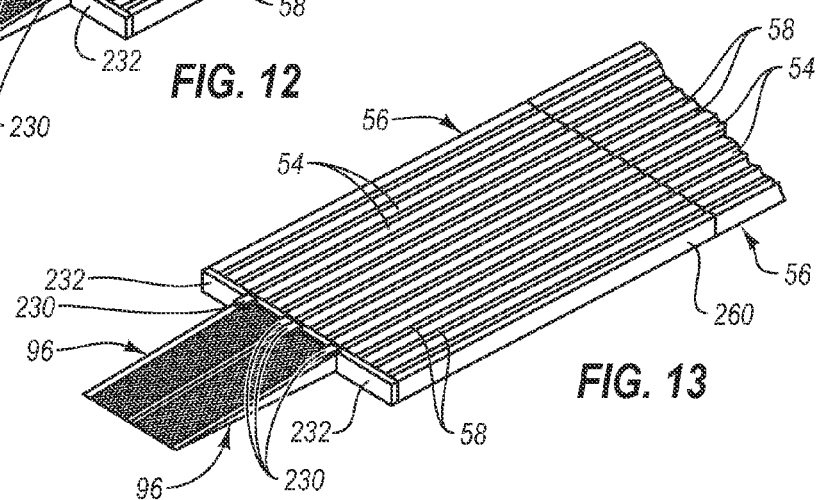

FIG. 13 is similar to FIG. 12, but shows an additional pad 56 being axially aligned and contiguous with a first pad 56 at non-fastened interface 260. A collector 60 is not shown, but would be at a drainage edge downstream and to the right as shown in FIG. 13.

Figure 14:
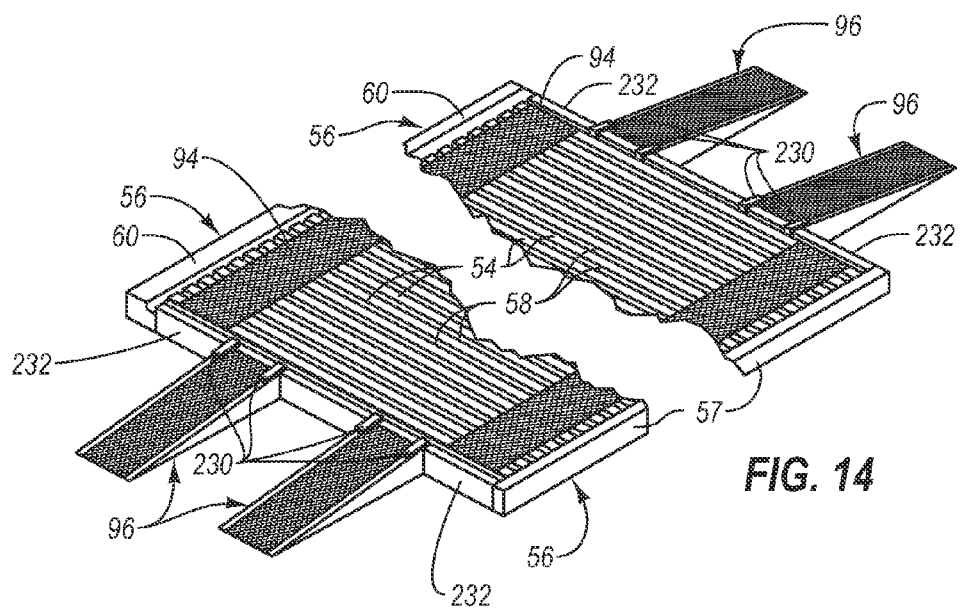

FIG. 14 illustrates placement of two or more wash pads 56 in contiguous consecutive edge-to-edge relation, with the flat ramps 96 transversely spaced a greater distance from each other, with drainage to one side edge and thence into one or more collectors 60. Expanded metal grating, to improve operator traction is illustrated as being superimposed over parts of the surfaces 54 to create an operator catwalk, the grating accommodating movement of wash water and debris therethrough into the drainage grooves 58.

The embodiment of FIG. 14 utilizes a drive through principle where a vehicle ramps onto surfaces 54 utilizing one set of gently inclined ramps 96 at one end edge of the array of wash pads 56 and accommodates ramping off the wash pads at an opposite end edge utilizing the other two ramps 96. Washing on surfaces 54 in the embodiment of FIG. 14 can occur either while the vehicle is stationary, while it is moving, or some of both. FIG. 14 further illustrates that a barrier to flow, such as rectangular bar 57, may be used at the high edge of the pad in accordance with the present invention to prevent loss of drainage on the high side cause by the pressure displacement of the wash liquid.

FIG. 15 illustrates a modular array of a plurality of wash pads 56 having a plurality of pads arranged transversely to vehicle displacement thereacross and a plurality of pads arranged parallel to the displacement of a vehicle. The embodiment of FIG. 15 is substantially similar to FIG. 4, with the slope of the array being toward the central collector 60 as described earlier. The displacement of the vehicle is unidirectional, on a drive through single direction basis. Eight ramps are provided, four at each end and the sets of two to accommodate larger vehicles with wide tires. Specifically, each contiguous set of ramps 96 allow a single wide wheel vehicle to ramp onto or off from the array. Washing of debris from the large vehicles supported on surfaces 54 can be on a stationary vehicle basis, a moving basis or a combination of the two.

Reference is made to FIG. 16 which differs from the embodiment of FIG. 2 in the direction of the drain and in that the metal grating 94 covers the entirety of the undulating top comprising support surfaces 54 and grooves 58. The configuration of the wash pad of FIG. 16, accordingly, accommodates immediate passage of wash water and debris through the grating 94 into the axially disposed grooves 58 and thence into collector 60.

Reference is now made to FIG. 17 through 20, which collectively illustrate one way in which walls may be assembled for erection upon one or more wash pads in accordance with the present invention to confine spray liquid and removed debris from vehicles and other objects to a region directly above the pad or array of pads. It is to be appreciated that any type of wall may be used and, therefore, the wall components depicted in FIGS. 7 through 20 and hereinafter described are merely representative. Because individual wash pads may be of different sizes and arrays modularly combined wash pads may likewise have varying dimensions, vertical walls above the top impervious element or elements must be sized consistent with the size of the pad installation.

FIG. 17 illustrates how a peripheral wall frame, generally designated 280, may be formed. Specifically, mitred lengths of angle iron may be used to form an open rectangular frame into which wall sections are placed. One element is top bar 282, a second is notched bottom bar 284 and a third and fourth are opposite hand side angles 286 and 288. When assembled at mitred corners 290 at the top as by welding and at blunt ends 292 where welding also secures the lower corners, a square rectangular frame is formed. This frame is preferably protected against rusting and other forms of corrosion by a suitable anti-corrosion coating, using commercially available technology. Frame 280 is constructed so as to internally receive two or more smaller frame members, generally designated 294 and shown in FIG. 18. Each sub-frame 294 comprises a top bar 296, a drip edge 156 to assist in displacing spent liquid and debris into the collector and opposite band side members or columns 300. A planar barrier 302, such as a sheet of corrosion resistant plastic, is anchored within the frame 294 so as to be impervious to liquid. Two of more of the sub-frames 294 are anchored within frame 280 of FIG. 17 in vertical edge to vertical edge impervious relation in any satisfactory commercially available way, to form a wall segment. As many frames 282, with sub-frames 294 confined therein as are necessary, are utilized to form, collectively, one of the walls. The same approach may be utilized to create all other walls. An angle member 304 may be placed at each 90 degree wall intersection.

The wall segments may be post mounted to the wash pad or pads in the manner described in conjunction with FIGS. 7 and 21.

The collector or gutter 60 of FIG. 1 may take any one of several forms and is normally used along one pad edge, although the present invention is susceptible of configurations which use more than one collector 60 at any desired pad edge. The objective of the collector 60 is to provide complete containment of substantially all of the spent wash liquid and substantially all of the removed-debris as it flows, as an effluent drainage, from the flow channels 58 of the impervious wash pad 56. In addition to containment, collector 60 functions to segregate liquids from solids to accommodate, when desired, recycling of the liquid and disposal of the solids at a landfill or other site, in an environmentally acceptable fashion.

The collector 60 of FIG. 22 comprises an impervious box with an axially-directed notch 320 along one of the two elevated corners through which the above-mentioned drainage flows from the pad into the collector 60 from the wash pad. The notch 320 may be placed immediately below the drip edge 156 (FIG. 7) to accommodate directionalized flow into the generally hollow interior of the gutter or collector 60. Flow or access is permitted to the collector 60 of FIG. 22 only through the top or through apertures 322 at each end. The collector is otherwise sealed and impervious.

The collector 60 of FIG. 22 comprises an axially directed side wall 324 adjacent to the notch 320, which is rectangular and planar, a second axially-directed larger side wall 326 which has a height greater than side wall 324 by an amount defined by notch 320, is rectangular in shape and planar in form. Side walls 324 and 326 are illustrated as being equally spaced one from another through their entire length and merge with a bottom wall or floor 328 at impervious corners 330 and 332. A pair of opposite hand end plates 334 and 336 are integrally connected to the aligned ends of members 324, 326 and 328 in an impervious way, except for the apertures in end plates 334 and 336. Because the collector 60 is sloped in one direction, the upper aperture 322 is redundant.

Accordingly, the collector 60 is essentially an elongated box having a hollow interior. The collector 60 of FIG. 22 may comprise a filter 338 (FIG. 23) may be placed within the hollow interior of the collector 60 in such a way that the slightly sloped collector requires flow through the filter 338, allowing liquid downstream and holding solids upstream. The filter 338 may comprise a coalescing agent or material, which collects and retains all debris in the nature of petroleum products so as to accommodate recycling and reuse of the filtered wash liquid.

To help separate solids from wash liquid, one or more transverse weirs may be placed in the slightly sloped collector 60. Any suitable weir may be used, including but not limited to weir 342, illustrated in FIG. 24. All liquid being gravity displaced along the gently sloped collector 60 accumulates to a certain height and then passes through slot 344 of weir 342. Because solids are heavier than the wash liquid confined to the collector 60, the solids settle to the bottom of the collector 60 while clarified or substantially clarified liquid passes through the weir slot 344.

The clarified liquid ultimately becomes an effluent at downstream aperture 322. Alternatively, aperture 322 may be closed and a commercially available sump pump placed at the downstream end of the gutter 60 to remove and recycled the liquid for subsequent use in the manner illustrated in FIG. 1. The sump pump 345 may be in a catch basin which receives the liquid discharge issuing from aperture 322.

When it is desired to remove solid sediment from the collector 60 of FIG. 22, a hinged flat top or cover 346 is pivoted at hinges 348 into an open position and the solids which have accumulated in the collector 60 are removed with a suitable tool, such as a shovel. The removed solid debris is typically hauled to and discarded at an environmentally approved fill site.

When the lid 346 is closed, as illustrated in FIG. 22, along an edge of a pad, safety in the use of wash pads in accordance with the present invention is enhanced because the top surface of the lid 346 allows the operator to step thereon (intentionally or inadvertently) with low risk of injury.

FIGS. 25 and 26 illustrate a modified form of gutter or collector 60, designed to process larger quantities of drainage. Much of gutter 60 shown in FIGS. 25 and 26 is identical to the gutter 60 of FIG. 22 and has been so enumerated in FIGS. 25 and 26. No further description of these features is necessary.

At spaced intervals, within the hollow interior of the collector 60 of FIG. 25 is located a plurality of fixed floor engaging cradles 350, each identical to the others. Cradles 350 each have an arcuate upper surface 352, upon which rests a matching curved chute 354. Chute 354 is illustrated in FIG. 26, but is removed from FIG. 25 for purposes of clarity.

However, in the assembled condition of FIG. 25, chute 354 rests contiguously upon and is fastened to each curved cradle surface 352.

The liquid and solid drainage passes through slot 320 of the collector 60 of FIG. 25, as explained above, and engages the top surface of the chute 354. The accumulated drainage on the top surface of chute 354 can simply be gravity and liquid flow displaced toward the lower of the two ends of the collector 60 and discharged, after which segregation of liquids and solids can take place. Preferably and in the alternative, a screw conveyor can be associated with the collector 60 of FIG. 25 and particularly with the chute 354 for machine displacement of the drainage immediately upon arriving at the collector 60 of FIGS. 25 and 26, in the manner explained hereinafter in conjunction with FIGS. 27, 29 and 30.

Reference is now made to FIG. 27, which shows an automated system by which drainage comprising substantially all spent wash liquid and substantially all debris removed from a vehicle or other object, after being deposited or collected in gutter 60, is displaced immediately along and therefrom using motorized equipment. Specifically, at the higher of two ends of the gutter 60 of FIG. 25 is an anchored motor 360, the draft shaft of which turns a belt or chain drive 362, which in turn rotates a drive shaft 364 to which an auger or screw conveyor, generally designated 366 is non-rotatably fastened. The screw conveyor 366 comprises at least one flight or blade 368 such that the turning of the blade 368 will displace along chute 354 either liquid and solids collectively or solids without regard to liquid, depending upon the spacing, if any, between the outer edge of the helical blade 368 and the interior surface of the chute 354. As a consequence drainage deposited in collector 60 is displaced from left to right, as viewed in FIG. 27, along the chute 354 to the outlet aperture 322, where the displaced drainage falls by force of gravity and is processed as hereafter explained.

While the edge of the helical blade 368 may be contiguous with chute 354 or nearly so, so that all drainage is displaced as described above, it is presently preferred that a gap between the peripheral portion of the blade 368 and the top surface of the chute 354 be utilized. That accommodates displacement of substantially all of the solids comprising the drainage, with the liquid being permitted to flow beneath the screw conveyor at an increased velocity so as to carry with the flow residual solids at the lower apex of the top surface of chute 354 to and through the effluent aperture 322. Thus, in the embodiment of FIG. 27, when the auger or screw conveyor 366 is rotating, there is little accumulation of drainage within the gutter 60 and particularly on the chute 354. The embodiment of FIG. 27 better accommodates installations where a substantial amount of wash water and removed debris are delivered to gutter 60 and require more rapid processing. The gutter of FIG. 22 is designed to accommodate smaller quantities of drainage.

In reference to FIGS. 29 and 30, one auger embodiment of the present invention comprises a helical blade 368, integrally and non-rotatably secured to the screw conveyor shaft 370 with stiff brush bristles 372 being carried at the outer edge of the helical blade so as to sweep debris from the chute to the extent the bristles 372 engage the top surface of chute 354. In the embodiment of FIG. 30, where a spacing 374 is caused to exist between the apex of the top surface of chute 354 and the bristles 372, the contiguous sweeping is at the more upright portions of the chute 374, as shown in FIG. 30.

The drainage effluent issuing from the effluent opening 322 in the collector 60 of FIG. 27 falls by force of gravity onto a motor driven, angularly disposed conveyor 380, which comprises metal drive belt 382, made of porous metal or other porous material, comprising pivotably connected perforated conveyor sections and upright transverse slats 384 interposed between the conveyor sections. The size of the openings in the sections of the conveyor belt 382 determine the size of particles are retained on the conveyor 380 and the size of particles along with the liquid which pass through the conveyor into a repository sub ground level sump pump 386. The larger particles retained on the conveyor belt 382 are prevented from rolling downward under force of gravity by engagement with the plurality of transverse slats 384, such that all solids deposited on the conveyor 382 which do not pass therethrough are delivered to the elevated distal end 388 and from thence, by gravity into a repository 390 for solids. The repository may be a portable collection box, a dump truck or any other suitable type of containment. The solids accumulated in repository 390 are ultimately transported and deposited at landfill, in compliance with all environmental requirements.

Extensive description of the screw conveyor 366 and the conveyor 380 is not necessary because these items are conventional and commercially available.

The liquid and solid drainage deposited in repository 386, which is an in-ground sump, may be accumulated and from time to time pump 392 may be actuated to displace both small particle solids and liquid through discharge tube 394 for processing in the manner generally set forth in FIG. 1, i.e. liquid clarification, settlement of solids, segregation of clarified liquid from the settled solids, with the solids being transported to a suitable landfill and clarified liquid being filtered and recycled or discharged to a sanitary sewer for additional use.

Figure 28:
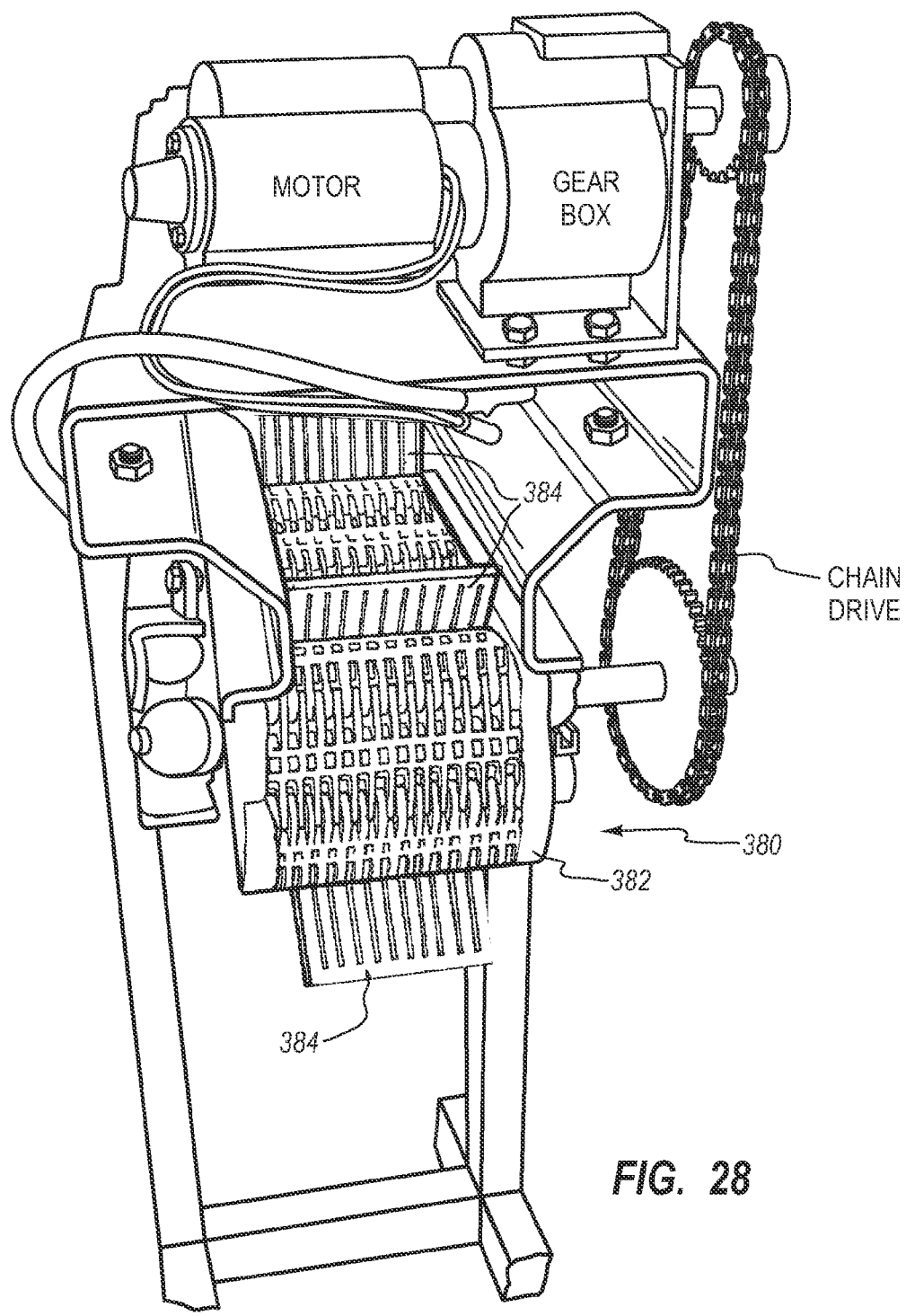
FIG. 28 is an enlarged perspective of the upper output end of the belt conveyer illustrated in FIG. 27.

While a specific type of commercially available conveyor is illustrated in FIG. 28, any suitable conveyor capable of accomplishing the purpose for which conveyor 380 is provided may be used.

In lieu of the belt conveyor 380, as shown in FIG. 27A, drainage discharge from gutter 60 caused by screw conveyor 366 and chute 354 may be received at a lower level of second screw conveyor system 381.

A screw or auger 383 of screw conveyor system 381 is spaced from the throat a chute 385 so that only larger solids are displaced to the top of the conveyor system 381 and into container 390, while the smaller solids and liquid drain down the throat of the chute 385 into the sump 386.

Figure 31:
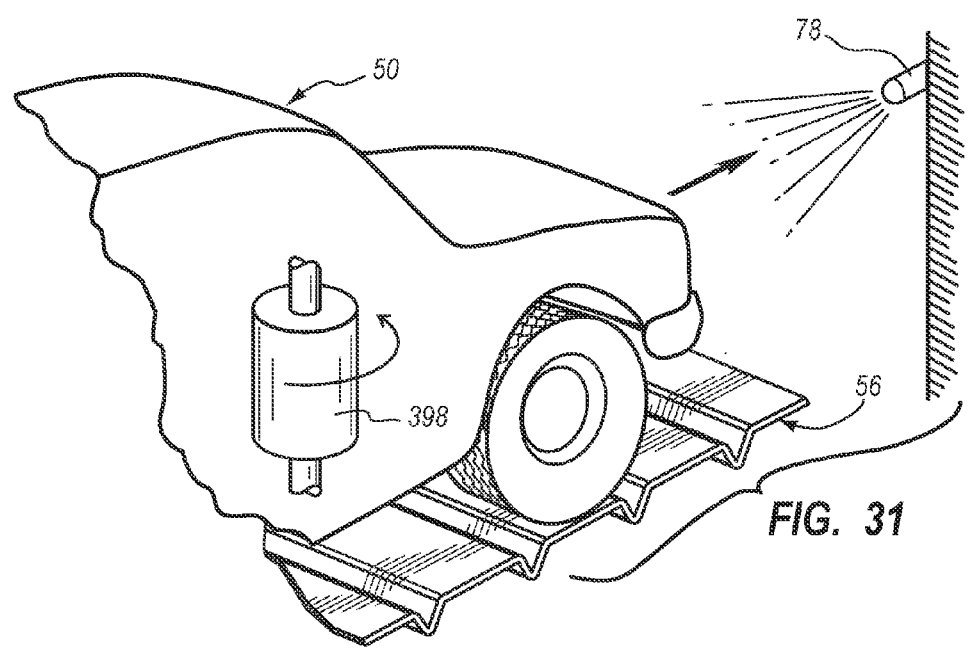
FIG. 31 diagrammatically illustrates in fragmentary perspective features of the present invention by which a moving vehicle on a pad may be washed and scrubbed using fixed automatic spray nozzles and rotating scrubbers.

Reference is now made to FIG. 31, which illustrates that wash pads in accordance with principles of the present invention lend themselves to utilization of fixed position or mechanically supported and movable spray nozzles 78 and machine driven scrubbers 396 to remove debris from a vehicle, motor-driven or motorless, as the vehicle is slowly displaced across a wash pad by either rail or conveyor, or by a driver. Alternately the equipment to be washed may be stationary while the wash nozzles and/or brushes move past the equipment to be washed.

Figure 32:
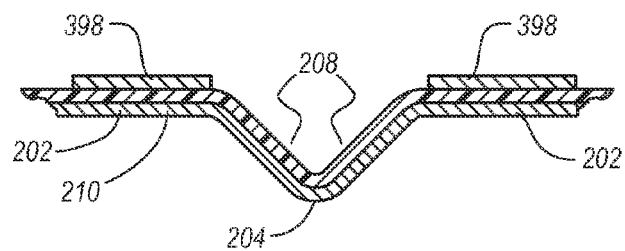
FIG. 32 is a fragmentary cross section showing use of abrasive strips or coating to improve vehicle and operator traction.

FIG. 32 illustrates an embodiment of the present invention similar to FIG. 9 except the lower side of the top element 210 is not coated with corrosion resistant material, but the top surface is coated with corrosion resistant material 210 and, superimposed thereon are strips of abrasive material 398 by which traction for both the vehicle and the operator of the wash pad is significantly improved and the risk of a slip and fall accident is alleviated.

The invention may be embodied in other specific forms without departing from the spirit of the central characteristics thereof. The present embodiments therefore are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for surface treating vehicles and other equipment, comprising:
    at least one pad positioned above ground level and comprising:
        a support base;
        first and second sides; and
        a top surface that rests on the support base and includes a perimeter having at least one peripheral edge, the top surface being impervious from the first side to the second side, the top surface being configured to support vehicles and other equipment on top of the impervious surface between the first and second sides and drain liquid and solid particles to the at least one peripheral edge;
    a collector configured to collect the liquid and solid particles positioned on the top surface, at least a portion of the collector extending along a lateral side of the wash pad and laterally outside the perimeter along the at least one peripheral edge of the top surface.

2. Apparatus according to claim 1 wherein the collector is positioned below the at least one peripheral edge.

3. Apparatus according to claim 2 further comprising segregating drainage structure associated with the collector and configured to segregate the liquid and the solid particles.

4. Apparatus according to claim 3 wherein the segregating drainage structure comprises at least one weir configured to provide gravity sedimentation of the solid particles toward a bottom of the collector.

5. Apparatus according to claim 2 further comprising a mechanism for displacing the liquid and solid particles collected in the collector to a discharge site for segregating the liquid from the solid particles.

6. Apparatus according to claim 2 wherein the collector comprises a curvilinear floor.

7. Apparatus according to claim 2 further comprising a catch basin downstream of the collector into which discharge from the collector is deposited such that the liquid and the solid particles flow into the catch basin.

8. Apparatus according to claim 7 further comprising structure configured to segregate the solid particles and the liquid in the catch basin, wherein the segregated liquid is available for reuse in washing.

9. Apparatus according to claim 7 further comprising a pump associated with the catch basin for pumping the liquid and solid particles from the catch basin.

10. Apparatus according to claim 2 further comprising an openable cover superimposed over the at least one collector, wherein the openable cover is operable between a closed position and an open position.

11. Apparatus according to claim 2 further comprising a pump positioned outside of the collector and configured to pump at least some of the liquid and solid particles collected in the collector.

12. Apparatus according to claim 2 further comprising a mechanism for displacing the liquid and solid particles from the collector, at least a portion of the mechanism being positioned outside of the collector.

13. Apparatus according to claim 2 further comprising at least one filter arranged in the collector to separate at least some of the solid particles from the liquid.

14. Apparatus according to claim 13 wherein the at least one filter is replaceable with another filter having different filtering properties.

15. Apparatus according to claim 2 wherein at least a portion of the collector includes a U-shaped cross-section.

16. Apparatus according to claim 2 wherein the collector comprises a floor, at least a portion of the floor having a U-shaped cross-section.

17. Apparatus according to claim 2 further comprising a mechanism configured to separate at least some of the solid particles from the liquid and move the separated solid particles away from the collector.

18. Apparatus according to claim 17 wherein the mechanism collects the collected solid particles in a solids repository.

19. Apparatus according to claim 2 wherein the liquids collect in a liquids repository.

20. Apparatus according to claim 19 further comprising a pump positioned in the liquids repository, the pump configured to pump a slurry of the liquids and at least some solid particles from the liquids repository for further filtering.

21. Apparatus according to claim 2 further comprising at least two pads arranged side-by-side, the collector being positioned between the at least two pads below the at least one peripheral edge of each pad for collecting the liquid and solid particles positioned on the top surface of each pad.

22. Apparatus according to claim 1 further comprising liquid processing equipment for recycling the liquid for reuse as cleaning liquid.

23. Apparatus according to claim 1 further comprising ramps that are removable from the at least one pad without removal of fasteners.

24. Apparatus according to claim 1 further comprising structure by which the at least one pad is mechanically lifted and transported as a unit from one location to another location for subsequent use.

25. Apparatus according to claim 1 further comprising an anti-skid material superimposed on at least a portion of the at least one pad to improve equipment and human traction.

26. Apparatus according to claim 1 further comprising grooves in the top surface of the at least one pad that define flow paths for draining the liquid.

27. Apparatus according to claim 1, further comprising a ramp structure for ingressing the vehicles and other equipment onto and off the at least one pad.

28. Apparatus according to claim 1 further comprising a source of influent liquid for surface treating at least a portion of an exterior of the vehicles and other equipment.

29. Apparatus according to claim 28 wherein the source of influent liquid comprises at least one stationary source of pressurized influent liquid.

30. Apparatus according to claim 1 further comprising at least one scrubber for surface treating the vehicles and other equipment.

31. Apparatus according to claim 1 further comprising:
at least two pads each including first and second sides and a top surface, the top surface including at least one peripheral edge and is impervious from the first side to the second side;
connecting structure by which the at least two pads are joined to form a pad array.

32. Apparatus according to claim 31 wherein the collector is positioned below the at least one peripheral edge of the at least two pads.

33. Apparatus according to claim 31 wherein the collector is located central of the array below a space between peripheral edges of the at least two pads.

\* \* \* \* \*